United States Patent [19]
Girouard, Sr. et al.

[11] Patent Number: 6,131,272
[45] Date of Patent: *Oct. 17, 2000

[54] CROSS-TIE PRE-PLATING SYSTEM

[75] Inventors: Gerald D. Girouard, Sr., New Iberia; Gerald D. Girouard, Jr., Lafayette; Donald Darcey, New Iberia, all of La.

[73] Assignee: Coastal Timbers, Inc., New Iberia, La.

[ * ] Notice: This patent is subject to a terminal disclaimer.

[21] Appl. No.: 09/273,600

[22] Filed: Mar. 22, 1999

Related U.S. Application Data

[63] Continuation-in-part of application No. 09/161,135, Sep. 25, 1998, which is a continuation of application No. 08/665,670, Jun. 20, 1996, Pat. No. 5,813,103, which is a continuation of application No. 08/300,749, Sep. 6, 1994, Pat. No. 5,528,807, which is a continuation of application No. 08/207,118, Feb. 28, 1994, Pat. No. 5,343,606, which is a continuation of application No. 08/085,400, Jun. 30, 1993, abandoned.

[51] Int. Cl.$^7$ .................................................. B23P 21/00

[52] U.S. Cl. .............................. 29/714; 29/798; 104/17.1

[58] Field of Search .................................. 29/33 K, 798, 29/464, 466, 468, 564.1, 795, 714; 198/406, 445, 456; 104/17.1

[56] References Cited

U.S. PATENT DOCUMENTS

| | | |
|---|---|---|
| 567,232 | 9/1896 | Greenshield . |
| 578,869 | 3/1897 | Haley . |
| 594,731 | 11/1897 | Dowe . |
| 680,542 | 8/1901 | Peter . |
| 703,755 | 7/1902 | Bender . |
| 712,167 | 10/1902 | Wood . |
| 2,591,005 | 4/1952 | Piper ...................................... 104/17.1 |
| 2,762,313 | 9/1956 | Sublett . |
| 3,064,428 | 11/1962 | Plasser . |
| 3,405,649 | 10/1968 | Foxx et al. . |
| 3,701,320 | 10/1972 | Fearon et al. . |
| 3,717,101 | 2/1973 | Katcha et al. . |
| 3,753,404 | 8/1973 | Bryan . |
| 4,178,671 | 12/1979 | Lutting . |
| 4,280,613 | 7/1981 | Stewart . |
| 4,351,465 | 9/1982 | Moehlenpuh et al. ................... 227/150 |
| 4,373,652 | 2/1983 | Matlock et al. ......................... 198/456 |
| 4,393,784 | 7/1983 | Theurer . |
| 4,691,639 | 9/1987 | Holley . |
| 4,928,600 | 5/1990 | Urmson, Jr. et al. . |
| 4,942,822 | 7/1990 | Cotic . |
| 5,067,412 | 11/1991 | Theurer et al. . |
| 5,331,899 | 7/1994 | Holley ....................................... 104/16 |

(List continued on next page.)

FOREIGN PATENT DOCUMENTS

| | | |
|---|---|---|
| 0652257 | 3/1979 | U.S.S.R. . |
| 1054477 | 11/1983 | U.S.S.R. . |
| 1670024 | 8/1991 | U.S.S.R. . |

*Primary Examiner*—S. Thomas Hughes
*Assistant Examiner*—Steven A Blount
*Attorney, Agent, or Firm*—Joseph T. Regard Ltd. plc

[57] ABSTRACT

A machine for fastening rail plates to cross-ties, utilizing spikes or the like, and method therefore, is disclosed in the present invention. The preferred apparatus of the present invention teaches a system wherein there is provided a conveyor for conveying a plurality of laterally arranged, aligned ties, a loader for loading a single tie upon a template conveyer, and a positioner for positioning a tie at each station during the pre-plating process. The present invention further includes a template system for securing the cross-tie or tie in place, feeding and positioning the rail-plate in place, feeding, dispensing, and positioning the spikes in place, driving the spikes, and discharging the processed tie, the template system utilizing as a principle motive force the displacement of the template reciprocating drive piston for positioning the template, as well as dispensing the plates. The present invention further is configured to facilitate the installation of threaded spikes or screws, as are utilized in high-speed, concrete and other cross-ties. A drilling station is therefore provided for drilling bores into the tie, along with a separate screwed pre-plating station which includes a template for positioning the tie, a plate dispenser, and an array of racheting mechanisms for engaging and screwing threaded spikes or screws into the bores formed by the drilling station to securely pre-plate each plate on a tie, which may be wood or concrete, traditional or high-speed.

25 Claims, 17 Drawing Sheets

U.S. PATENT DOCUMENTS

| | | |
|---|---|---|
| 5,343,606 | 9/1994 | Giouard, Sr. et al. . |
| 5,398,616 | 3/1995 | Eidemanis et al. . |
| 5,528,807 | 6/1996 | Giouard Sr. et al. . |
| 5,588,578 | 12/1996 | Doyle ........................................ 29/798 |
| 5,615,616 | 4/1997 | Scheuchzer et al. .................. 104/17.1 |
| 5,813,103 | 9/1998 | Giouard, Sr. et al. . |

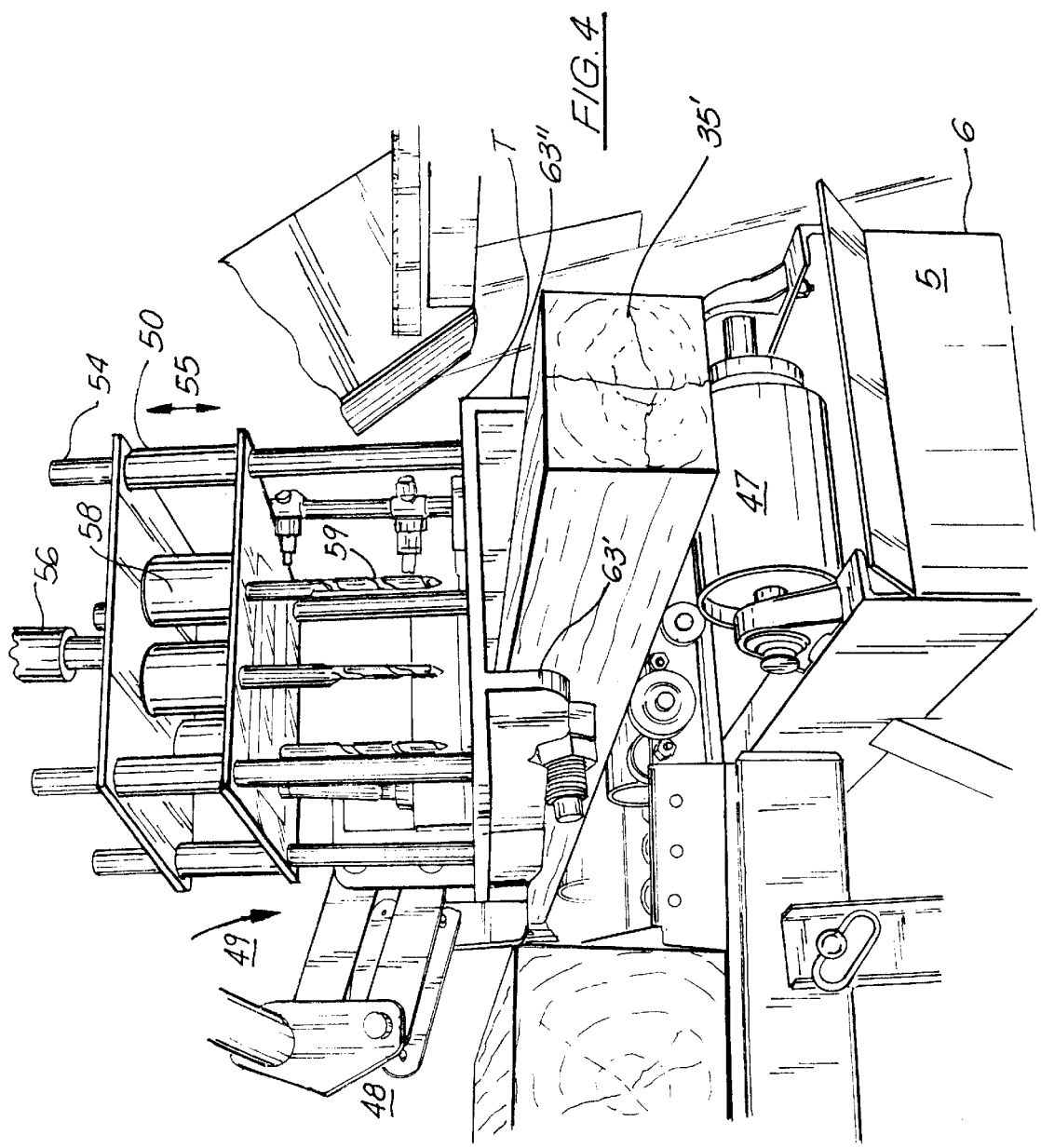

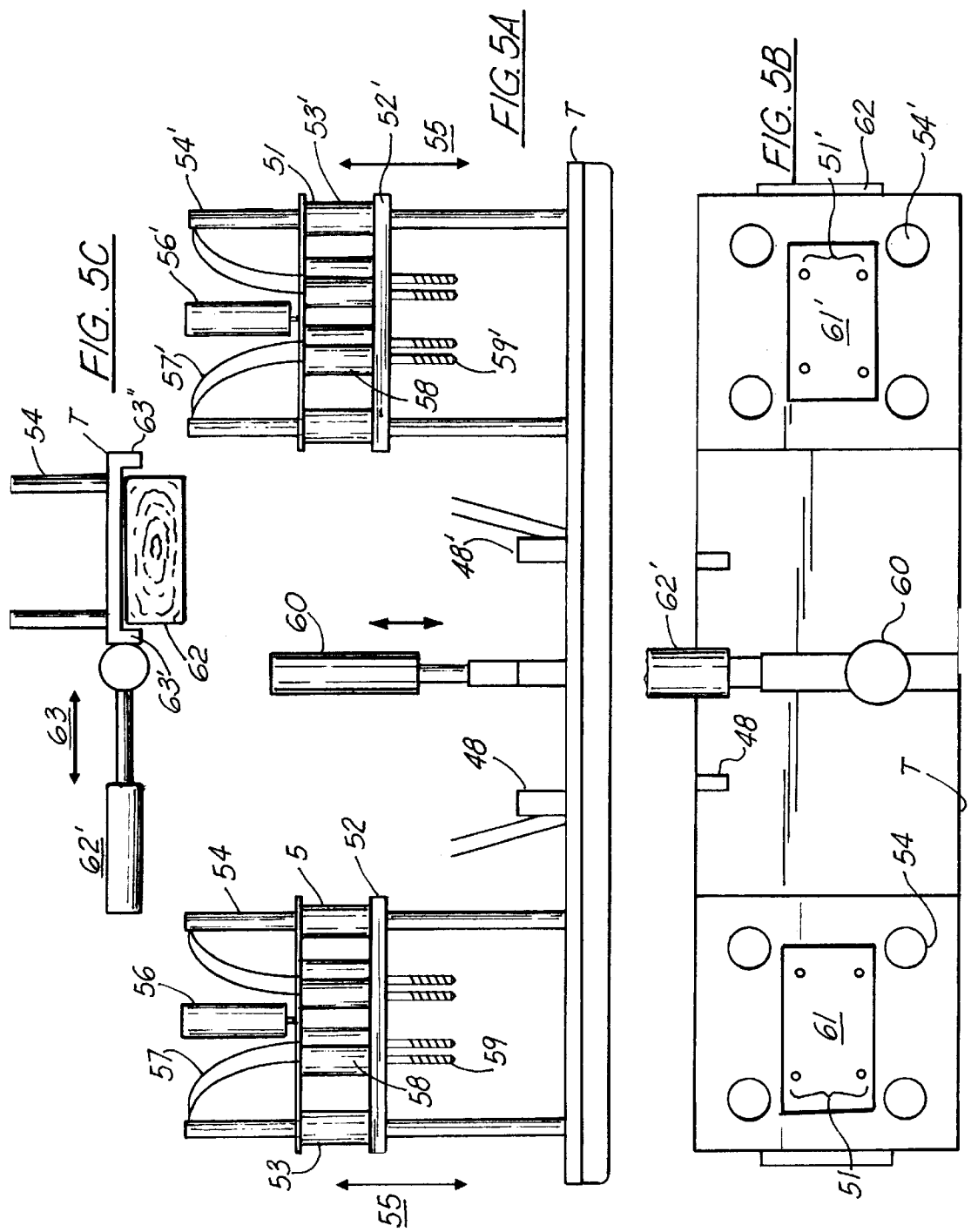

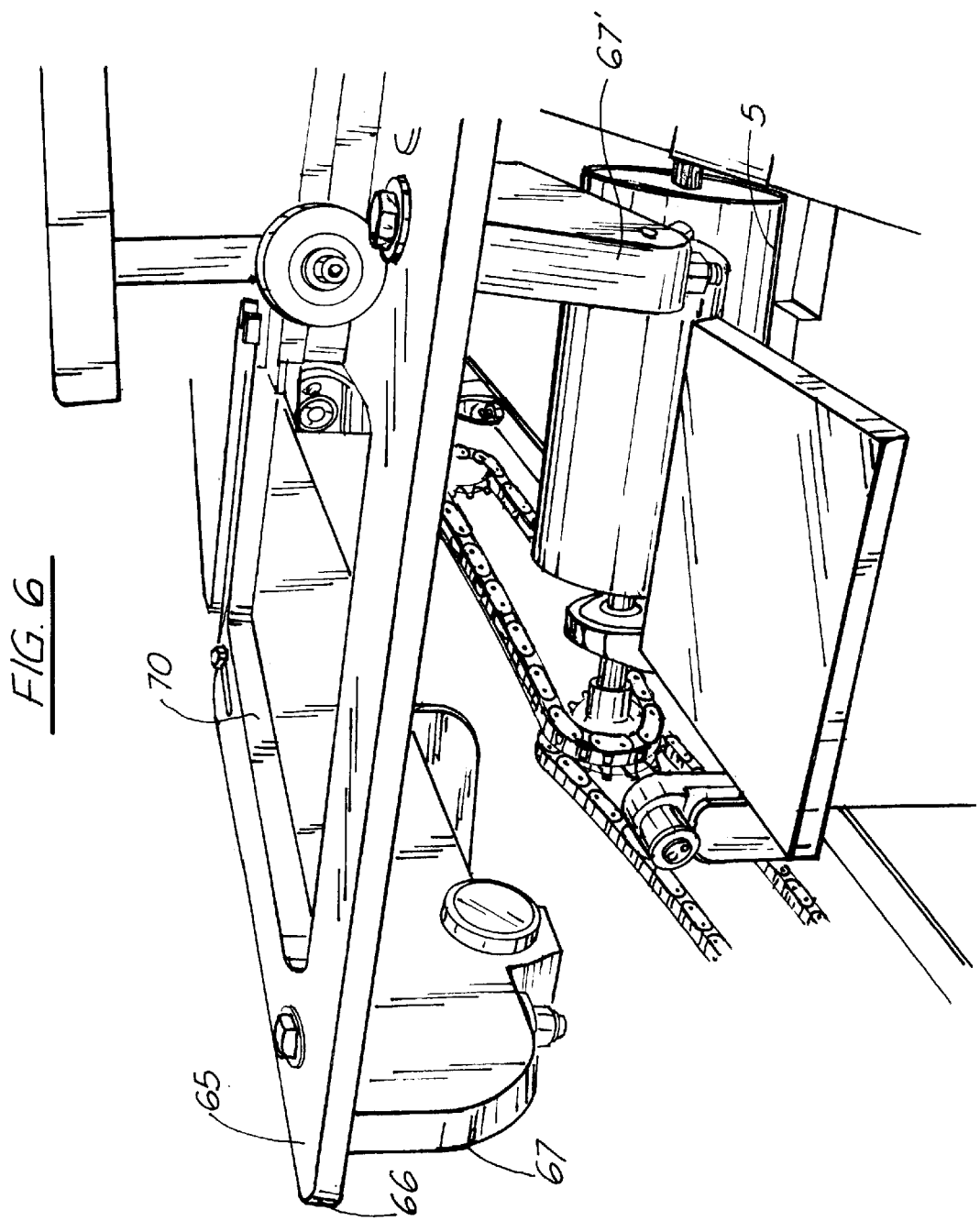

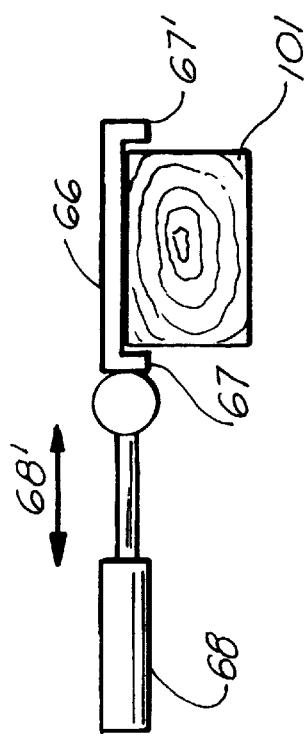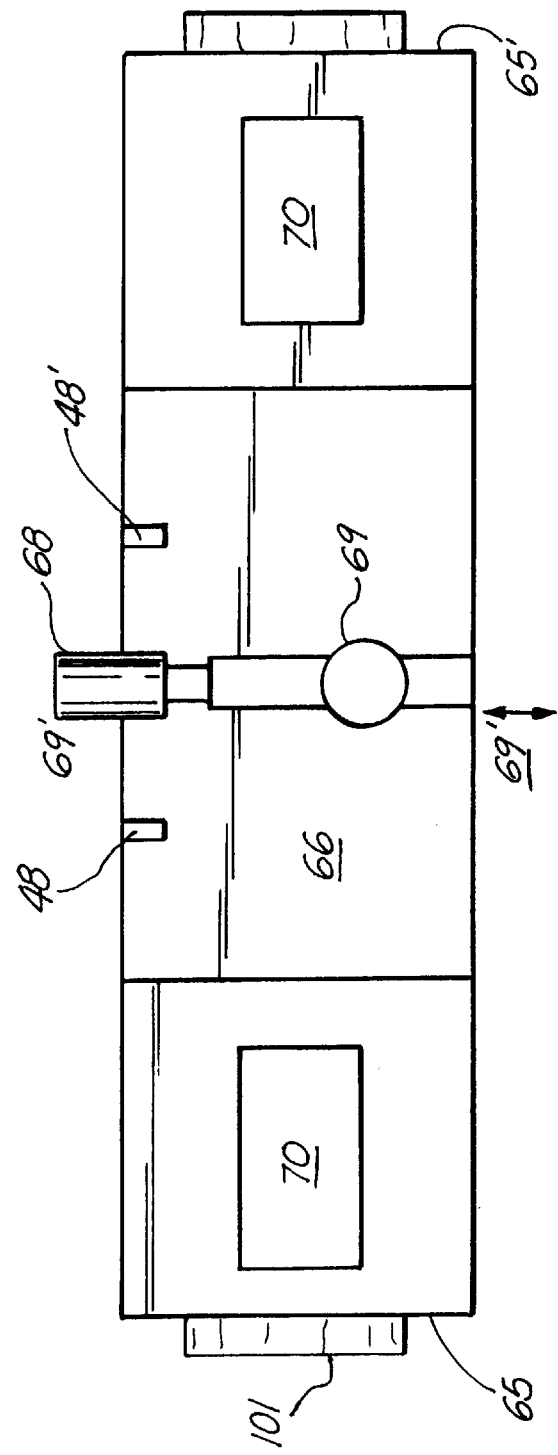

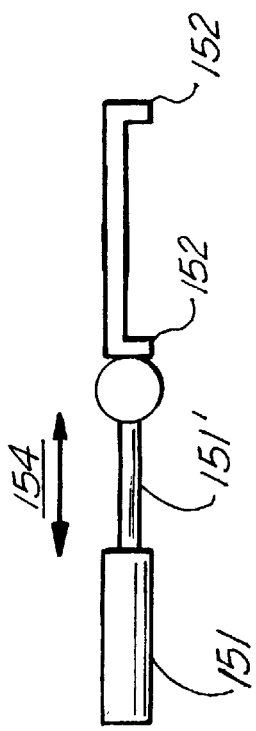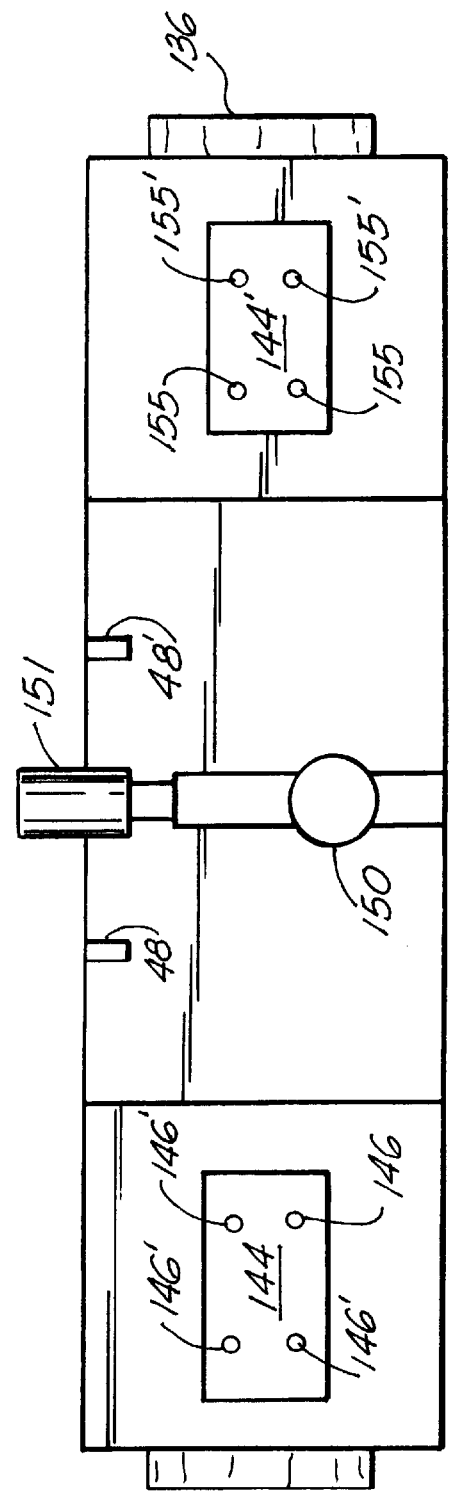

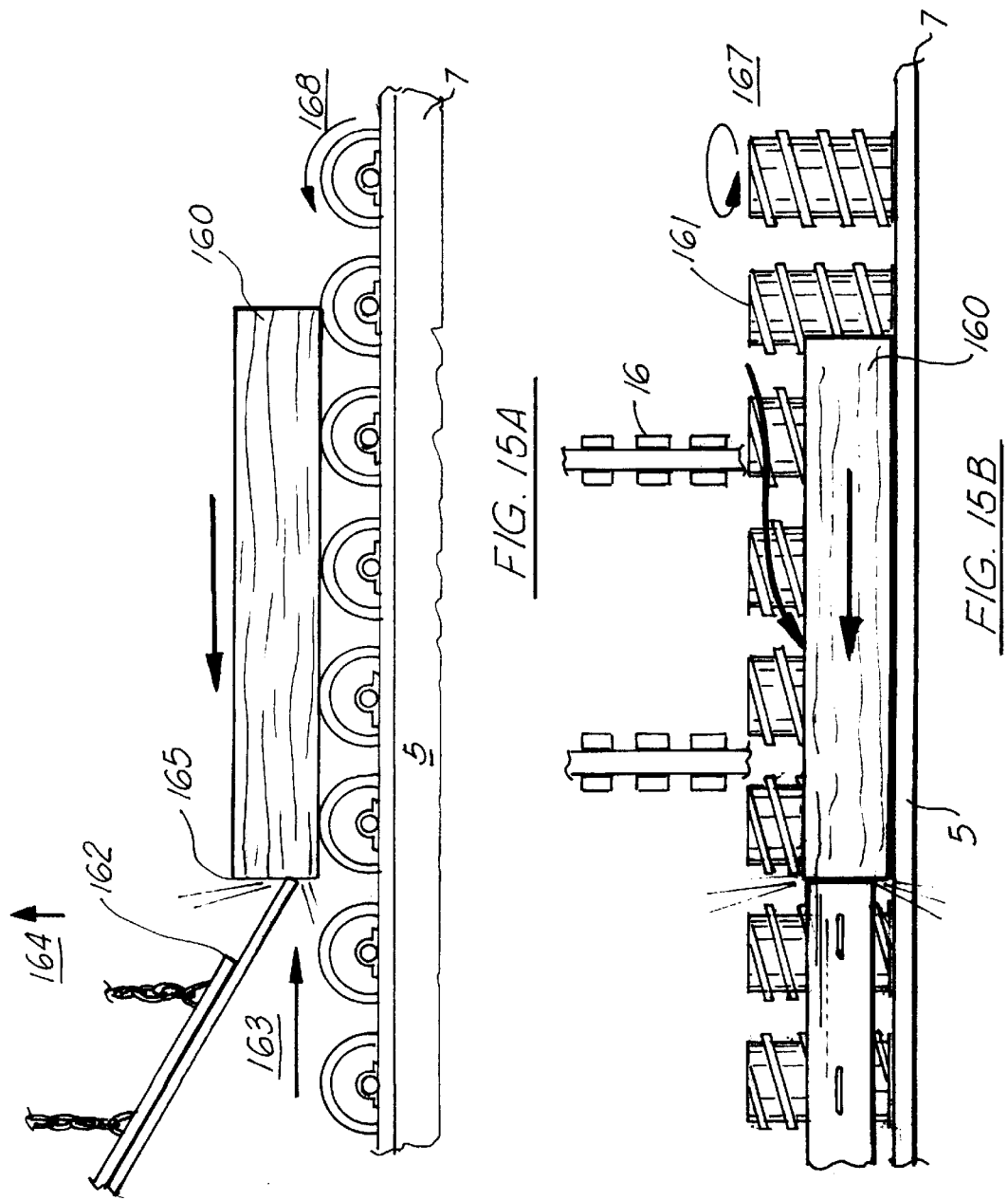

CROSS-TIE PRE-PLATING SYSTEM

STATEMENT OF PRIORITY

The present application is a continuation-in-part of patent application Ser. No. 09/161,135, filed Sep. 25, 1998, listing as inventors Gerald D. Girouard, Sr., Gerald D. Girouard, Jr., and Donald Darcey, which is a continuation of Ser. No. 08/665,670, U.S. Pat. No. 5,813,103, filed Jun. 20, 1996, entitled "Cross-Tie Pre-Plating System", listing as inventors Gerald D. Girouard, Sr., Gerald D. Girouard, Jr., and Donald Darcey, which patent is a continuation of Ser. No. 300,749, U.S. Pat. No. 5,528,807, issued Jun. 25, 1996, filed Sep. 6, 1994, entitled "Cross-Tie Pre-Plating System", listing as inventors Gerald D. Girouard, Sr., Gerald D. Girouard, Jr., and Donald Darcey, which patent is a continuation of Ser. No. 08/207,118, U.S. Pat. No. 5,343,606, issued Sep. 6, 1994, filed Feb. 28, 1994, entitled "Cross-tie Pre-Plating System", listing as inventors Gerald D. Girouard, Sr., Gerald D. Girouard, Jr., and Donald Darcey, which patent is a continuation of patent application Ser. No. 08/085,400, filed Jun. 30, 1993, now abandoned.

TECHNICAL FIELD OF THE INVENTION

The present invention relates to Railroad construction apparatus, and in particular to a machine for fastening rail plates to cross-ties, utilizing spikes or the like, and method therefore, is disclosed in the present invention.

The preferred apparatus of the present invention teaches a system wherein there is provided a conveyor for conveying a plurality of laterally arranged, juxtaposed ties, a loader or kicker for loading a single tie upon a template conveyer, and positioning means for positioning a single tie at each station during the pre-plating process.

The present invention further includes a template system for securing the cross-tie or tie in place, feeding and positioning the rail-plate(s) in place, feeding, dispensing, and positioning the spikes in place, driving the spikes, and discharging the processed tie, the template system utilizing reciprocating drive pistons for positioning the template, as well as dispensing the plates.

The present invention further is configured to facilitate the installation of threaded spikes or screws, as are utilized in high-speed, concrete and other cross-ties. A drilling station is therefore provided for drilling bores into the tie, along with a separate screwed pre-plating station which includes a template for positioning the tie, a plate dispenser, and an array of driving mechanisms for engaging and screwing threaded spikes or screws into the bores formed by the drilling station to securely pre-plate each plate on a tie, which may be wood or concrete, traditional or high-speed.

The present invention is unique in its relative simplicity when compared to prior art systems, providing a full array of pre-plating capabilities utilizing standard spikes or threaded means, various sized and composition cross-ties, on a relatively compact and road transportable, mobile platform.

BACKGROUND OF THE INVENTION

While the prior art has contemplated several systems, some going as far back as the late 1800's, for fastening rail plates or the like to railroad ties, most have proved to be so complicated as to be rather expensive to construct and maintain, or so simple as to be rather labor intensive and perhaps even dangerous to utilize. Perhaps this is why (even today) for pre-plating operations, manual installation of rail plates is still the preferred method, with laborers utilizing pneumatic hammers or sledge hammers for manually affixing rail plates to railroad ties, a slow, arduous, and undoubtedly dangerous task. A listing of prior patents which may have some general interest with regard to the present case are as follows:

| U.S. Pat. No. | Inventor(s) | Dates of Issue |
| --- | --- | --- |
| 567,232 | Greenshield, W. H. | 09/08/1896 |
| 578,869 | Haley, P. | 03/16/1897 |
| 594,731 | Dowe, G. W. | 11/30/1897 |
| 680,542 | Peter, J. S. | 08/13/1901 |
| 703,755 | Bender, G. L. | 07/01/1902 |
| 712,167 | Wood, F. W. | 10/28/1902 |
| 2,762,313 | Sublett, I. | 09/11/1956 |
| 3,405,649 | Foxx et al | 10/15/1968 |
| 3,701,320 | Fearon et al | 10/31/1972 |
| 3,717,101 | Katcha et al | 02/10/1973 |
| 3,753,404 | Bryan, J. F. | 08/21/1973 |
| 4,178,671 | Lutting, D. | 12/18/1979 |
| 4,280,613 | Stewart | 07/28/1981 |
| 4,393,784 | Theurer | 07/19/1983 |
| 4,928,600 | Urmson, Jr. et al | 05/29/1990 |
| 5,067,412 | Theurer et al | 11/26/1991 |

U.S. Pat. No. 3,701,320 (col 1) and U.S. Pat. No. 4,178,671 (col 1,2) teach or suggest the utilization of rollers for conveying laterally situated cross-ties for assembly and discharge.

U.S. Pat. No. 3,753,404 teaches (FIG. 6) a type of gravity feed for spikes, although the configuration and operation is fully distinguishable from the present, searched for invention.

U.S. Pat. No. 4,280,613 issued Jul. 28, 1981, teaches a "Tie Plate Conveying and Orienting System" wherein there is taught a system for dispensing tie plates.

Unlike the present invention, however, '613 does not teach or contemplate individual dispenser control and movement dependent upon the upstroke and downstroke of the spike fastening means.

U.S. Pat. No. 3,405,649 issued Oct. 15, 1968 teaches a "Spike Driver", contemplating the utilization of gravity trays for the dispensing of spikes, in conjunction with jaws for grabbing each individual spike and placing same over the area to be driven. However, '649 does teaches a jaw configuration and manipulation means more complicated and distinguishable from the present invention, both in terms of operation and implementation.

U.S. Pat. No. 703,755 issued 1902 contemplates a "Tie-Plating Machine" wherein there is taught the utilization of "gage-plates" or the like for holding the tie-plates in proper position, while being forced into the tie (the tie plates in this system utilize a distinguishable fastener built-in, as understood), the system being again distinguishable from that contemplated in the present, searched for invention.

As one may discern from a review of the above patents, the prior art has yet to contemplate an efficient, cost effective, road mobile, yet safe and relatively uncomplicated system for pre-plating railroad ties or the like. Perhaps this is why manual installation is still considered, by far, the most cost effective means of accomplishing this task. However, with increasing labor costs, relatively dangerous and strenuous conditions, as well as the inherent limitations of speed and supervision involved with a work crew, automated alternatives would be preferable, provided satisfactory alternatives existed.

GENERAL SUMMARY DISCUSSION OF THE INVENTION

Unlike the prior art, the present invention provides railroad-tie pre-plating system which is comparatively low maintenance and reliable, while being relatively inexpensive to manufacture, flexible in the type of fastening means, plate and tie configuration, size, and material utilized, while being consistent in cycle time and output quality.

The preferred embodiment of the present invention teaches a system wherein there is included:

Gravity feed means for feeding the cross ties in bulk via decline rollers;

Retrieval means for retrieving an individual cross-tie from the gravity feed;

A first station comprising an drilling template and drilling means for providing precise bores for the insertion of threaded spikes or screws therein, this station for use with treaded spike fastening only;

A second station, comprising cross-tie positioning means, plate dispensing means, and spike alignment means to position a plurality of conventional spikes above the plate to be fastened, and spike driving means for driving said positioned, conventional spikes into the positioned cross-tie, fastening the plate(s) to the tie, this station for use with conventional, non-threaded spikes only;

A third station, comprising cross-tie positioning means, plate dispensing means, and spike alignment means to position a plurality of threaded or screwed spikes above the plate to be fastened, said spike alignment means further comprising threaded spike driving means for driving said positioned, threaded spikes into the positioned cross-tie, fastening the plate(s) to the tie, this station for use with threaded spikes only;

Discharge means for removing the pre-plated cross tie for stacking.

Also, spike feeding and dispensing means for dispensing individual spikes from a bulk of spikes in a storage mechanism may be provided at the second or third stations, or the spikes may be hand fed to the spike alignment means, as is shown in the preferred embodiment of the invention.

Unlike the prior art, the present invention contemplates a system wherein all of the various elements interrelate in function and operation, providing a more efficient, less redundant apparatus. As such, the present invention as currently configured in a working embodiment is capable of pre-plating as many as eighty (80)+cross-ties per hour cycle time with conventional spikes, with an average cycle time of about sixty (60) per hour; the time for affixing ties of exotic materials such as Azobe wood or the like, or affixing the plates to the ties via lag screws, will significantly lengthen the processing time per tie, but will still provide a significantly faster production time than conventional methods or apparatus.

It is therefore an object of the present invention to provide a railroad cross-tie pre-plating system which can pre-plate sixty plus cross-ties in an hour, with an average cycle rate of being just under one minute per tie, with conventional spikes. This is compared to a manual crew of five workers, which typically must take breaks on the hour (more on hot days), and whose hourly rate in optimal conditions will not exceed thirty (30) pre-plated railroad cross-ties per hour.

Unlike prior art pre-plating mechanisms for fastening via threaded spikes, which required a highly specialized, generally fixed, slow, and expensive system, the present preferred embodiment of the invention contemplates a mobile pre-plating system which provides unsurpassed flexibility over the prior art, teaching a mechanism and process which allows for pre-plating of most types of cross-ties, utilizing conventional or threaded spikes, in a fast, relatively inexpensive manner.

While the system is relatively portable, and able to be transported via road to a production site in three, readily assembled pieces on a single flatbed trailer, an alternative embodiment of the present invention teaches a version of the invention wherein the main conveyor/pre-plating area of the apparatus is located on a railroad flat car.

It is therefore an object of the present invention to provide a railroad cross-tie pre-plating system which is relatively simple in operation, yet efficient, reliable, and inexpensive to operate.

It is another object of the present invention to provide a railroad cross-tie pre-plating system which is able to be operated by one or two workers.

It is still another object of the present invention to provide a railroad cross-tie pre-plating system which provides a per unit cycle of one minute or less.

It is another object of the present invention to provide a railroad cross-tie pre-plating system which fastens plates to cross-ties via standard or threaded spikes, on a variety of sized or compositioned cross-ties.

Finally, it is an object of the present invention to provide a railroad cross-tie pre-plating system which may be readily disassembled, transported to a site location, and re-assembled with minor adjustments and start-up procedure.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein:

FIG. 4 is an isometric, end view of the first processing station of the present invention, wherein a tie has pilot holes drilled therein for lag screws or the like to retain the plates in place.

FIG. 5A is a front view of the first processing station of FIG. 4, illustrating the template having situated there above, in slidingly supported fashion, first and second drill arrays for facilitating pilot holes in a tie.

FIG. 5B is a top view of the template of FIG. 5A, illustrating the positions of spaces formed for the passage of the drill bits therethrough.

FIG. 5C is an end view of the template of FIG. 5A, illustrating the lateral positioning piston to facilitate tie positioning prior to drilling same.

FIG. 6 is a end, close-up view of the template of station two, that is, the spiking station, illustrating the tie conveyor and a plate conveyor.

FIG. 6A is a top view of the template of FIG. 6, illustrating the plate tray formed for the passage and retaining of the plate upon the cross-tie during securing of same.

FIG. 6B is an end view of the template of FIG. 6A, illustrating the lateral positioning piston to facilitate tie positioning prior to drilling same.

FIG. 10A is a top view of the template of FIG. 10, illustrating the plate tray formed for the passage and retaining of the plate upon the cross-tie during securing of same.

FIG. 10B is an end view of the template of FIG. 10A, illustrating the lateral positioning piston to facilitate tie positioning prior to drilling same.

FIG. 15A is a side view of the horizontal conveyor of the invention of FIG. 1, illustrating the conveyor backing the tie against a backstop for positioning the tie.

FIG. 15B is a top view of the invention of FIG. 15A, illustrating the tie positioned for dumping upon the unloading ramp.

DETAILED DISCUSSION OF THE INVENTION

Figure 1:
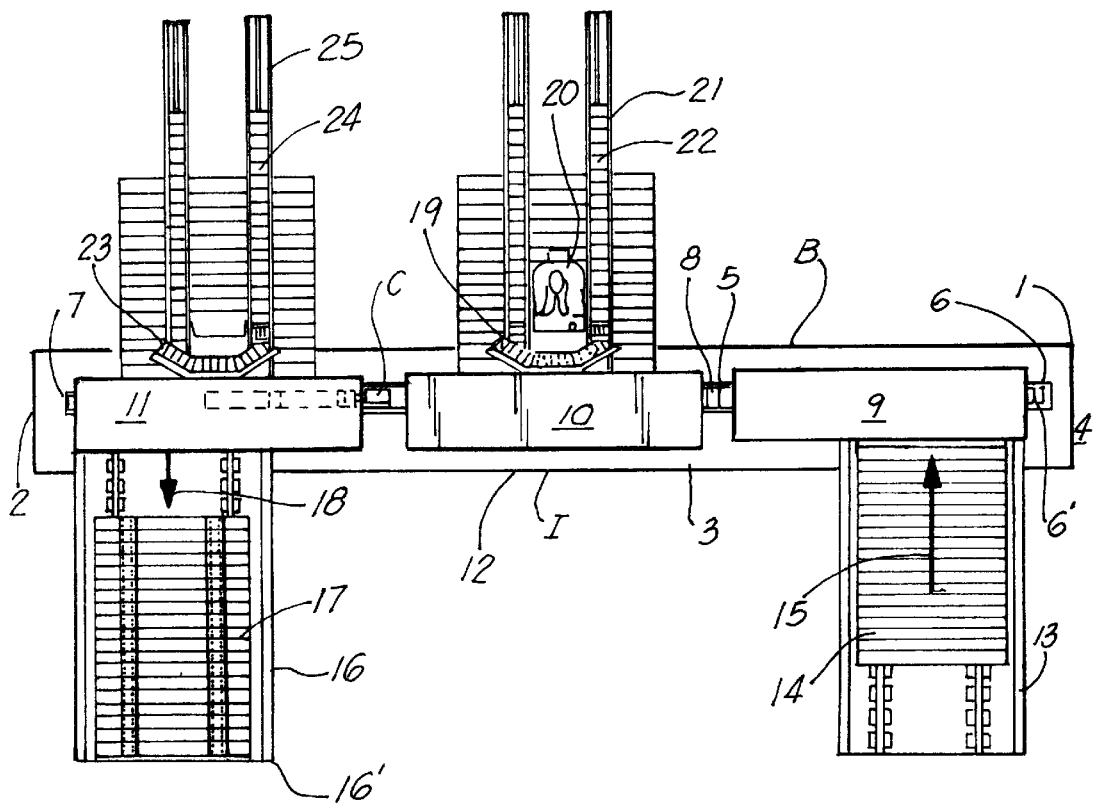
FIG. 1 is a top view of the preferred embodiment of the cross-tie pre-plating system of the present invention, illustrating the layout of the three operations stages for processing the ties of the present invention, interconnected by a processing conveyor having first and second ends, the cross-tie loading and unloading ramps communicating with said first and second ends, respectively.

Referring to FIG. 1 of the drawings, the cross-tie pre-plating system of the present invention I comprises an elongated base B, which, in the preferred embodiment of the present invention comprises a modified flatbed trailer for mobile transport, but can also easily be adopted to comprise a modified railroad flatcar, barge, or other mobile platform.

As shown, the base B has a top surface 3, first 1 and second 2 ends, and a longitudinal axis 4 which has aligned therewith a horizontal conveyor 5 along top surface 2, the top surface further having first 6 and second 7 ends situated in agreement with the first 1 and second 2 ends of base, respectively. Situated along the length of the conveyor 5 is a plurality of generally even spaced rollers 8 which are engaged to one another via chains, and which are powered to rotate via motor or the like, in order to selectively convey a cross-tie C along the length of the conveyor during pre-plating operations, transporting the cross-tie C from station to another, and depositing same from the conveyor after operations.

As shown, a plurality of un-plated cross-ties 14 are loaded upon a loading conveyor 13, which may be a gravity conveyor type (i.e., the end distal the horizontal conveyor is higher than the end closest the horizontal conveyor, with rollers thereupon to facilitate movement of the ties towards the horizontal conveyor 5) or the like configured to urge the ties placed thereupon, in laterally aligned fashion upon the conveyor, to urge the ties towards the horizontal conveyor 5 where the ties are loaded 15 upon the horizontal conveyor one at a time.

The ties are selectively loaded upon the horizontal conveyor 5 via a loading mechanism; once loaded upon the horizontal conveyor 5, each tie is then processed via one or more of three stations situated along the length of the conveyor, namely, a first drilling station 9 for drilling pilot holes, positioned for utilizing lag screws or the like for fastening the plates to the ties, a second spike driving station 10 (shown in the medial 12 area of the conveyor) for driving standard railroad spikes for fastening the plates to the ties, further including plate dispensing (via plate conveyor 21 for dispensing plates 22) and positioning means, and a third, screwing station 11 for screwing lag screws through the plates into the ties, which third screw driving station may also optionally include plate dispensing (via plate conveyor 25 for dispensing plates 24) and positioning means, as will be further disclosed and described infra.

The unit is principally controlled at a main operating station 19 by an operator 20, shown located generally centrally of the system to enable monitoring of all activities. Also shown is a secondary operating station 23 situated adjacent to the screw driving station 11 for controlling and monitoring same during operations.

Once each tie C is processed at stations 9, 10, 11, the tie C having traversed the horizontal conveyor 5 to the second end 7 is then deposited 18 upon unloading ramp 16, which may be a gravity conveyor downwardly directed from the horizontal conveyor, where each tie processed tie is urged to the distal end 16' of same, such that the ties 17 loaded upon the ramp 16, where the processed ties are situated in aligned fashion lateral to the ramp, ready for lifting via forklift or the like for further transport or processing.

Figure 2:
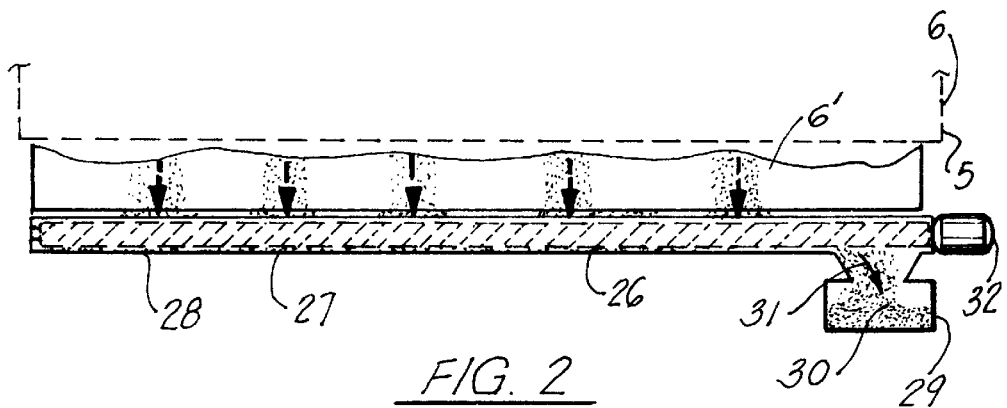
FIG. 2 is a side, partially cut-away view of the invention of FIG. 1, illustrating an auger mechanism longitudinally aligned under the processing conveyor, configured to collect and deposit sawdust and the like generated by the processing of the ties into a storage bin.
Figure 7B:
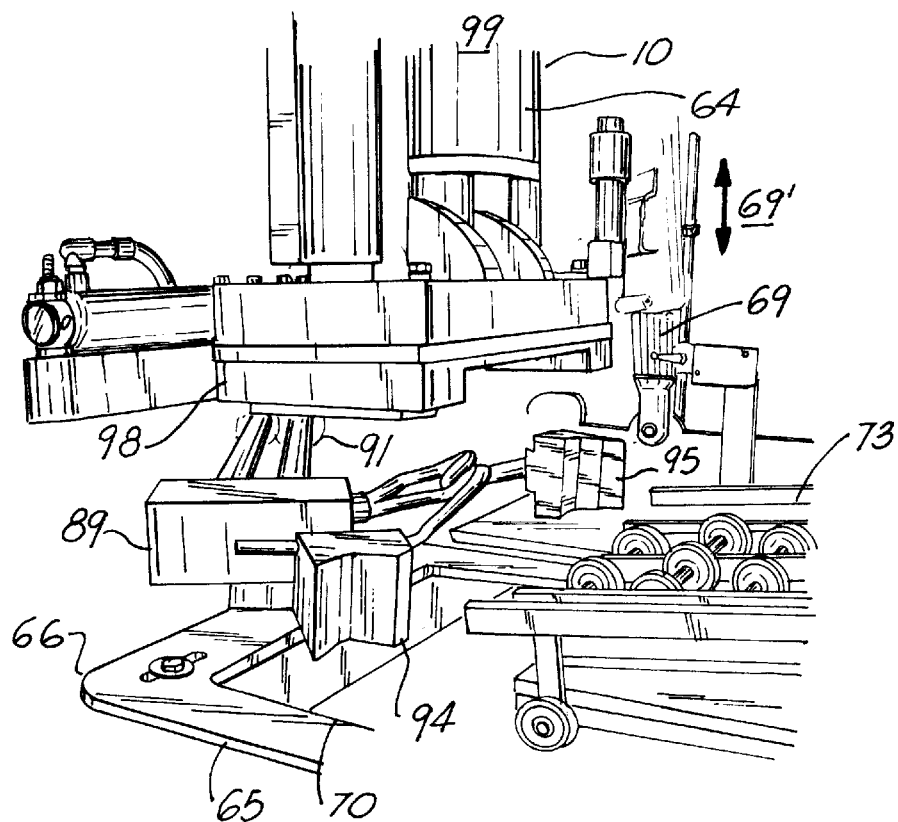
FIG. 7B is an isometric view of the second spiking arm, piston, plate conveyor, and template.
Figure 2A:
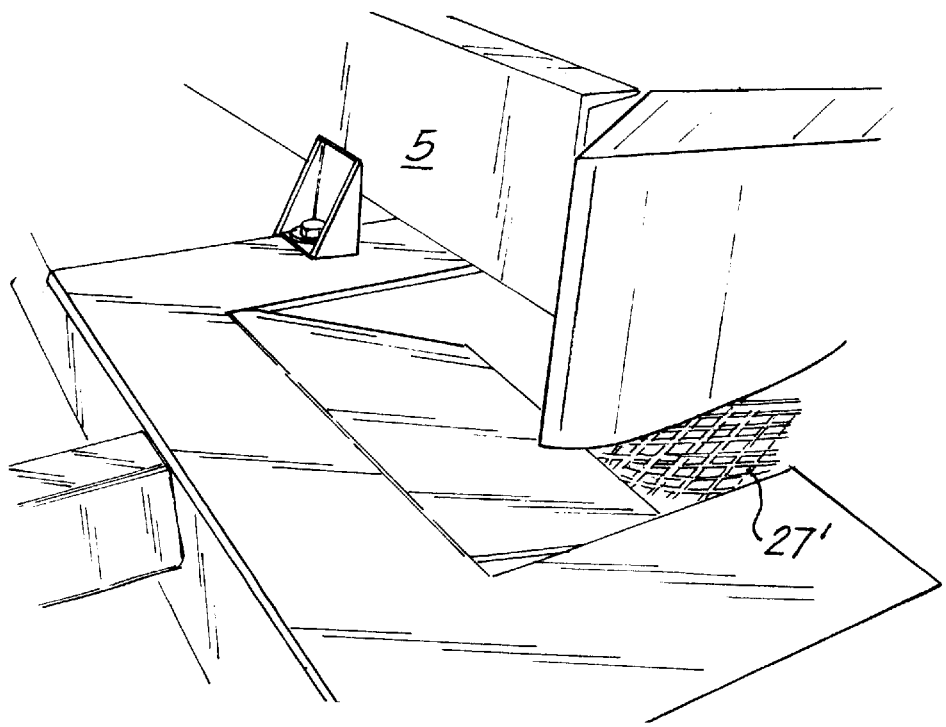
FIG. 2A is an upper, isometric view of a sawdust collection opening situated below the first, pre-boring station.

Continuing with FIGS. 1, 2, and 2A, situated in longitudinal alignment under the horizontal conveyor 5 is an auger 27 communicating with a plurality of collection areas 27' situated along the conveyor 5, the collection areas 27' situated in open spaces 6' formed between the rollers 8 on the conveyor 5, the open spaces forming passageways 26 for the passage of chippings, sawdust, and other debris generated by operations in processing the ties upon the conveyor at stations 9, 10, 11. The auger 27 is enveloped along its length between collection areas by a tube 28 which directs 31 the collected debris 30 into a collection bin 29. The auger may be driven by a motor 32 situated generally under the first end 6 of the conveyor 5, or some other location, as desired.

Figure 3A:
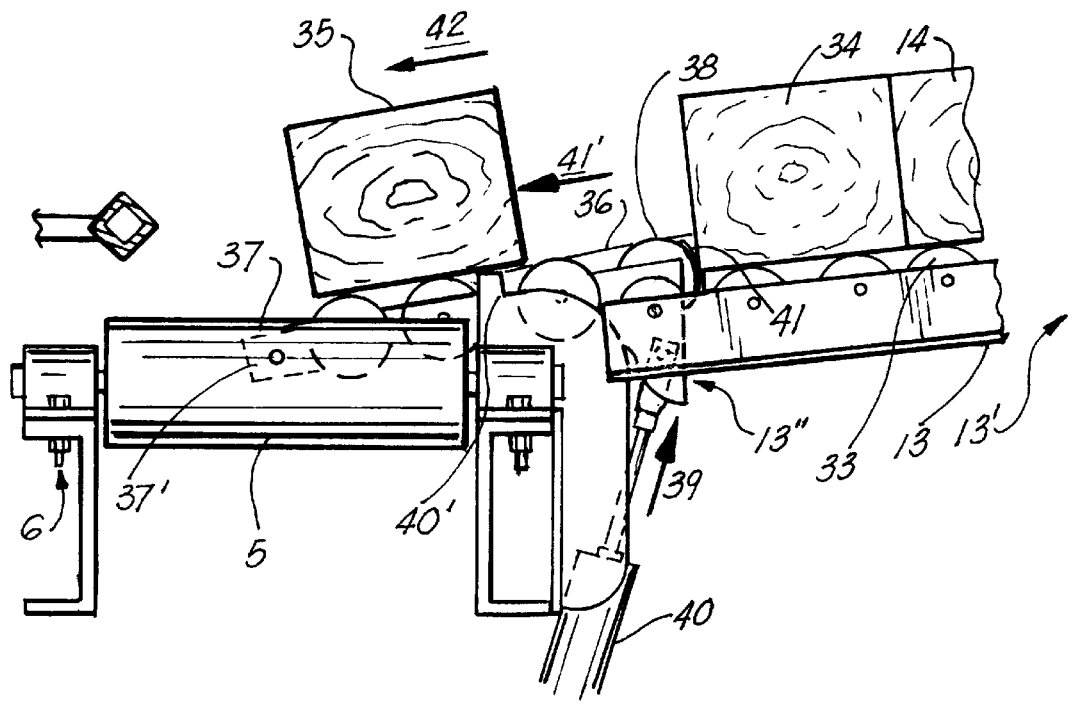
FIG. 3A is a side view of the loading mechanism of the present invention, illustrating the loader facilitating placement of a cross-tie upon the first end of the processing conveyor.
Figure 3B:
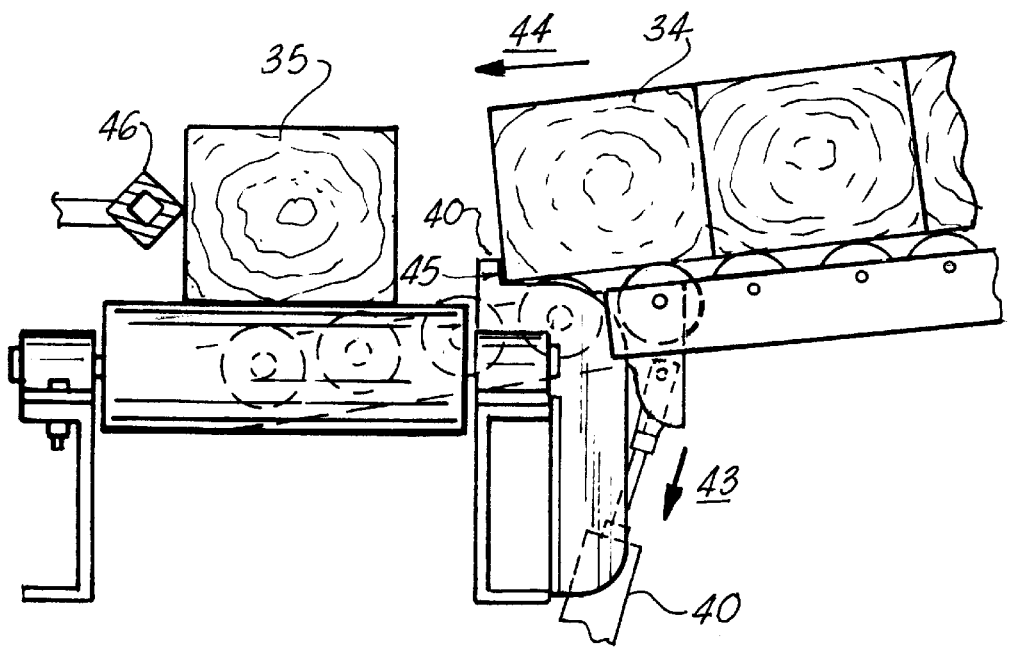
FIG. 3B is a side view of the loading mechanism of FIG. 3A, illustrating retraction of the mechanism to allow the next cross-tie to be dispensed to move into place.
Figure 7A:
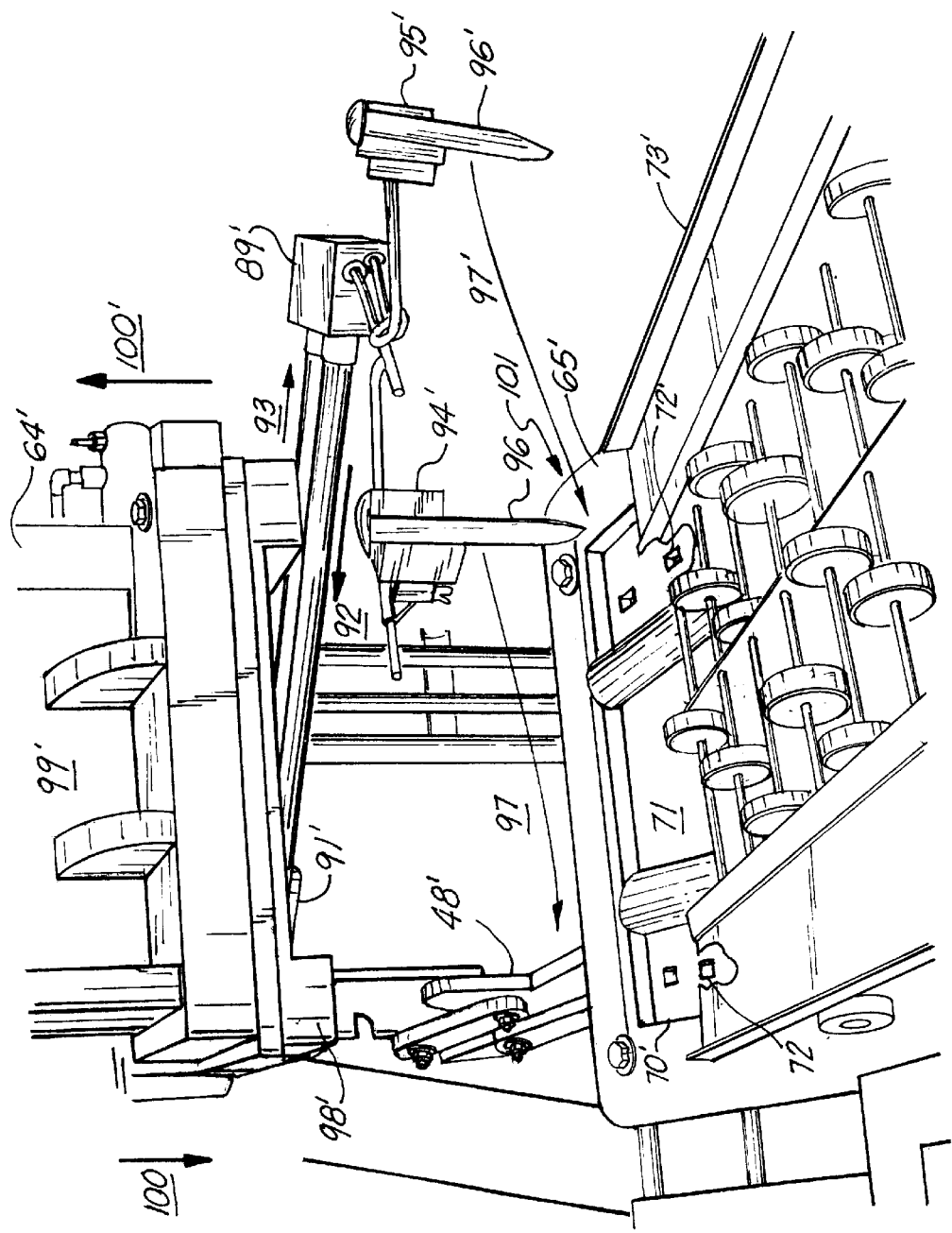
FIG. 7A is an isometric view of the first spiking arm, piston, plate conveyor, and template.

Continuing with FIGS. 3A and 3B, the loading ramp 13 or conveyor is, as indicated, a gravity type, wherein the first end 13' of ramp distal to the conveyor 5 is higher than the second end 13" of ramp adjacent to conveyor 5, with rollers 13 situated along the length of the upper section of the ramp to facilitate gravity transfer to the cross-ties 14 (tie, cross-ties, and railroad cross-ties are intended throughout this document to have the same meaning) along the length of ramp 13.

As shown, the ties 14 are dispensed individually to the horizontal conveyor 5 via the second, lower end 13' of the loading ramp 13, which utilizes a blocking member 40', configured to hold back the bulk of railroad ties and allow for the dispensing of a single loaded tie 35 upon demand. When a tie is desired to be loaded upon the horizontal conveyor for processing, as shown, a reciprocating piston 40 is actuated, lifting 39 a loading bar or kicker 36 at an angle (the kicker having a first, pivotally connected 37' end 37 in the region of the horizontal conveyor 5, the second end 38 lifting the tie 35 on the kicker above blocking member 40', while urging via gravity the tie along the rollers over 42 blocking member 40', along lifting bar and upon the conveyor 5, the tie engaging bumper 46 to facilitate alignment of same on the conveyor 5.

Concurrent with the loading of tie 35 onto conveyor, the second end 38 of the loading bar is lifted to also facilitate blocking 41 of the next tie to be dispensed 34, preventing the remaining ties from advancing uncontrollably upon the conveyor 5. Once the tie 35 is loaded, the loading bar 36 is lowered 43, allowing the next tie 34 to advance 44 over rollers to blocking member 40' as shown in FIG. 3B. A proximity switch and/or timer circuit may be utilized to facilitate the lowering of the loading bar, as the tie is loaded, allowing the next tie 34 to be dispensed to advance to the loading position 45 adjacent to blocking member 40'.

Continuing with FIGS. 4, 5A, 5B, and 5C, once the tie 35' is loaded upon conveyor 5, (in the vicinity of first end 6), it is situated upon rollers 47, which may be engaged to further position the tie in the appropriate position for processing at the first, drilling station 9 (if it is desired to utilized lag screws or the like with or instead of conventional spikes, otherwise the cross-tie 35' may progress to the next station).

Once the tie 35' is in the appropriate position on the conveyor 5, a template T engages the tie to position and facilitate the drilling of pilot bores therein. As shown, the template T has provided pivotal support arms 48, 48' to facilitate vertical positioning 49 thereof.

As shown, the template T supports first 50 and second 50' drilling arrays configured to drill first 51 and second 51' sets of pilot holes in tie 62, respectively for the later screwed insertion of lag screws therein. The first 50 and second 50' drilling arrays are provided upon first 52 and second 52' drilling platforms which slidingly engage vertical support members 54, 54' via engagement tubes 53, 53' to facilitate vertical movement 55, 55' via pistons 56, 56', all respectively. Pistons 56, 56' are reciprocating, and may be pneumatic or electric.

Continuing with the Figures, each drilling array 50, 50' comprises a plurality of motors 58, 58' driven by hoses (in the case of pneumatic or hydraulic) 57, 57' or wires (in the case of electric), each motor engaging a respective drill bits 59, 59', the drill bits arranged to provide the correct positioned pilot bores in the ties for the fastening of plates to the ties in the desired position, and may therefore be adjustable in this regard.

The template T is vertically adjusted via piston 60, and laterally adjusted 63 via lateral adjustment piston 62' which facilitates lateral adjustment of tie 62 for drilling via downwardly directed lips 63', 63" emanating from template T along its edges. First 61 and second 61' drilling spaces are formed through the template T to allow the passage of the drill bits 59 therethrough for the forming of pilot bores into tie 62.

Each drilling array 50, 50' is vertically adjustable via pistons 56, 56', configured to lift their respective arrays such that the drill bits 59, 59' are in a clear fashion during positioning of the tie to be drilled, and vertically adjusted 55, 55' to facilitate positioning of drill bits 59, 59' into contact with the tie 62, the motors 58, 58' engaged to facilitate rotation of the bits; ideally, then, the pistons 56, 56' are adjusted to allow the drill bits 59, 59' to drill the tie 62 (through drill spaces 61, 61', respectively) to the appropriate depth via gravity or light pressure, and upon reaching the desired depth, sensing means such as a proximity switch, dwell timer, or light sensor may be used to lift the drilling arrays via pistons 56, 56' and disengage the drills, respectively.

Once the pilot bores 51, 51' have been formed in the tie 62, the template is lifted and the tie is directed to the second station, where plates are placed thereupon with a conventional spike for fastening same may be used in conjunction with lag screws, or, if no pilot bores were formed and conventional spikes will be used solely for engaging the plates, the first, drilling station is skipped and the tie is directed straight to the second station 10. The second station may also be skipped if lag screws are the sole means of securing the plates to the tie, in which case the tie, after having pilot bores formed therein at the first, drilling station, will proceed directly to the third, screw station.

Continuing with FIGS. 6, 6A, 6B, 7A and 7B, the second, spike driving station 10 includes first 64 and second 64' spike driving areas for driving spikes to fasten a plate 71 into a tie 101. To position and retain the tie 101 in the appropriate position during processing, a template 66 is provided having first 65 and second 65' ends, and lateral adjustment lips 67, 67' downwardly emanating from each side edge thereof, respectively, so as to engage the sides of tie 101, and laterally position 68' same via lateral adjustment piston 68. Vertical adjustment piston 69 is provided to vertically adjust 69' the template to allow the passage of tie below or out from template.

First 70 and second 70' plate trays, comprising open areas formed in the top surface of template 66 to retain an individual plate in each respectively, is provided to allow automated dispensing of a plate into each plate tray such that teach plate rests upon the tie 101 being processed, and further allow the passages of spikes therethrough to fasten the plate to the tie, as will be further discussed infra.

Continuing with the figures, first 73 and second 73' plate conveyors are configured to dispense individual plates upon demand to plate trays 70, 70', respectively, wherein the plates, upon their placement into the plate trays by plate conveyors rest upon the tie 101 to be plated, and are framed by their respective plate trays, preventing movement of the plates upon the ties as they are fastened to the tie. In the present operating embodiment of the invention, the plate conveyors are configured as gravity ramps with rollers thereon, with the end of the conveyor distal to the template higher than the end closest the template, the conveyors situated in relatively lateral position in relation to the template above horizontal conveyor 5, with the first conveyor having its lowest end terminating adjacent to plate tray 70, and the second conveyor having its lowest end terminating adjacent to plate tray 70'.

Figure 8B:
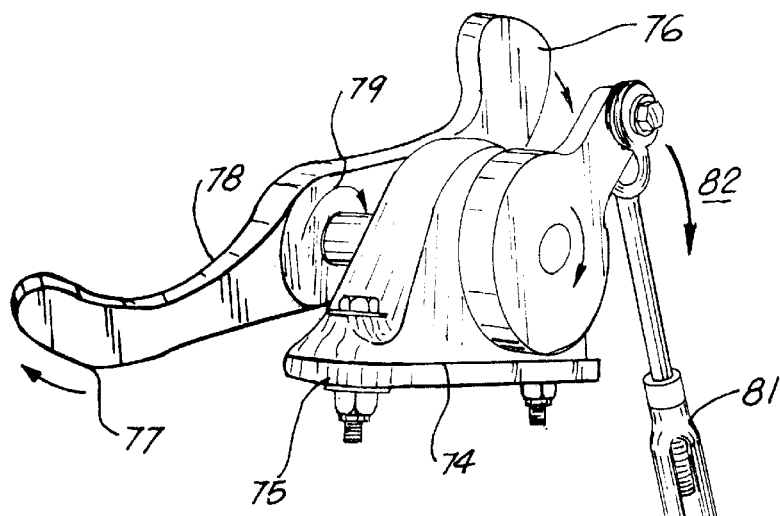
FIG. 8B is a close-up, isometric view of the plate dispensing member interfacing with the next plate to be dispensed on the plate conveyor.
Figure 8A:
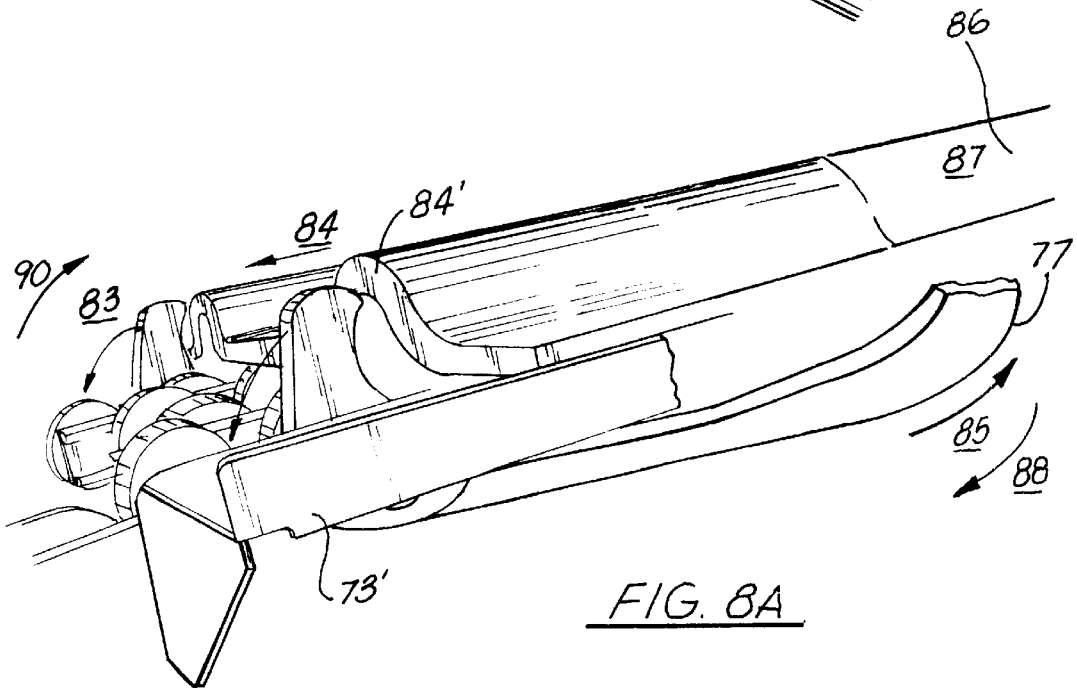
FIG. 8A is an isometric view of the plate dispensing mechanism of the plate conveyor of the present invention.
Figure 9A:
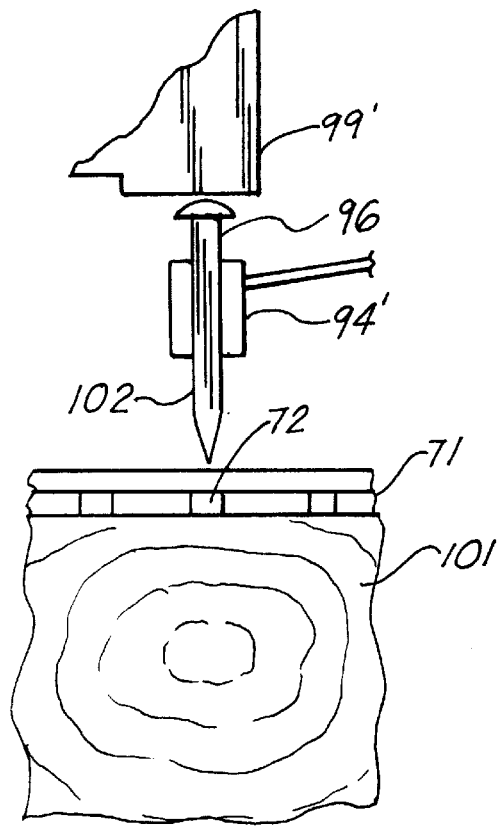
FIG. 9A is a close-up, side view of the spike holder, positioning system of the present invention, illustrating the magnetic spike holder holding a spike in a vertical position, with the spike holding piston having positioned the spike above the plate and tie, and below the strike driving piston.
Figure 9B:
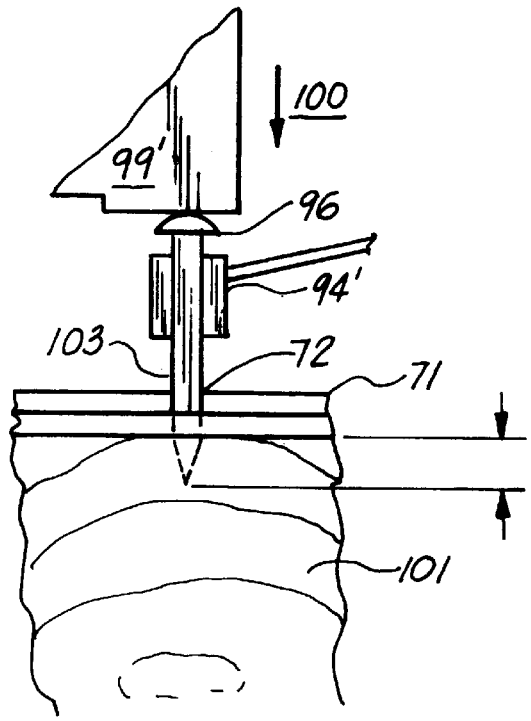
FIG. 9B is a close-up, side view of the spike holder and positioning system of FIG. 9A the present invention, illustrating the magnetic spike holder holding a spike in a vertical position, with the spike holding piston having positioned the spike above the plate and tie, and below the strike driving piston, with the spike driving piston further driving the spike into the tie.
Figure 9C:
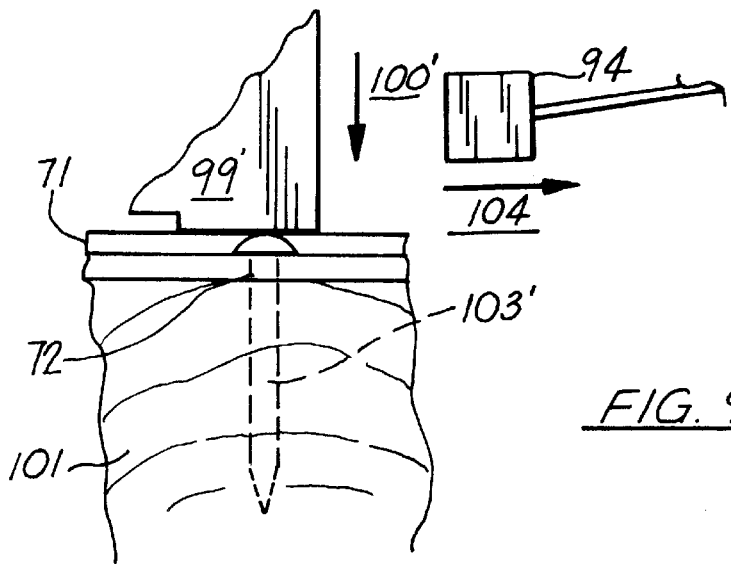
FIG. 9C is a close-up, side view of the spike holder and positioning system of FIG. 9A the present invention, illustrating the tie having been driven into the tie via the spike driving piston, with the spike holder having retreated from the area to avoid damaging same.

Referring to FIGS. 8A and 8B, each plate conveyor 73' has mounted therewith a plate dispenser mechanism 74 configured to dispense a single plate to allow dispensed plates to glide atop rollers situated along the length of the conveyor, so as to be dispensed to the plate trays formed in the template.

As shown, each plate dispenser mechanism 74 includes a base 75 having pivotally 79 connected thereto a dispenser member 77' having first and second ends, and pivotally connected to the base in general medial 78 area, the first end including an upwardly directed, front lip 77, the second end including an upwardly directed rear lip 76, the front lip 77 configured to pivot up 90 via control rod 80 so as to interface with the front edge 84' of front plate 84, preventing further forward movement of the front plate 84 along the conveyor until the operator desires dispensing same.

To dispense, the operator initiates control rod 80, which may simultaneously control plate dispenser mechanisms for both plate conveyors 73, 73', pivoting the front lip downward 83, releasing the front plate 84 and allowing same to continue along the plate conveyor to be dispensed upon the respective plate tray on its respective template, while simultaneously lifting 85 rear lip 77 so that it interfaces with the underside 86 of the next plate 87 to be dispensed, preventing said plate from further advancing while front plate 84 is being dispensed. Upon the front plate's 84 dispensing, the control rod 80 rotates to pull 82 rear lip 77 down 88, releasing the next plate 87, while simultaneously lifting 90 front lip 77, preventing migration of the next plate 87 past front lip 77, thereby placing next plate 87 into position as the next plate to be dispensed. The degree of pull from control rod 80 may be adjusted via adjustment mechanism 81. Upon dispensing, the plate 71 is dropped into plate tray 70' upon tie 101, in the manner shown in FIG. 7A.

Continuing with FIGS. 7A, 7B, 9A, 9B, and 9C, the first 64 and second 64' piston driving areas include first 89 and second 89' spike holder mechanisms, configured to each support at least first 94, 94' and second 95, 95' spike holders which, in the present, preferred embodiment of the invention are formed of a polymer material and embedded with a magnet to magnetically attract and hold spikes of ferris material such as steel or the like. The spike holders 94, 94, and 94', 95' are configured to hold, in generally vertical form, the spikes 96, 96' to be driven, positioning same above spike passages 72, 72' formed in each plate 71. Positioning is affected by generally horizontally 91' situated hydraulic pistons 91, 91', respectively, configured to extend 93 away to allow safe operator loading of spike via hand or mechanized spike loader system, then retract 92 to a position 97, 97' above the spike passages 72, 72', and below spike driver head 98, 98', which, driven by pistons 99, 99', respectively, drive each spike 102 down 100 into tie 101, wherein a sensor or dwell circuit initiates to pull 104 each spike holder 94 away from spike 103', allowing piston 99' to drive spike 103 completely into tie 101, securing plate 71 via the spike passing through spike passage 72'.

It is noted that the present illustrated fastening of two conventional spikes to a tie at spike passages 72, 72' formed in the plate are done to provide a secure plate for further securement via lag screws at station three (where pilot bores were formed at station one). The present machine can be used, however, in a conventional spike fastening capacity without the use of stations one and three, wherein four spikes are utilized to fix each plate, in which case there would be provided first and second sets of four spike holders situated above first and second plates, respectively. Thus, in such an alternate scenario, four spike holders would be shown in spaced fashion in each of FIGS. 7A and 7B, as opposed to the two each currently shown. Further, each of the spike holders would be positioned to hold the spikes above each outer spike passageway formed in the plates, illustrated as 137, 137', 138, 138' in plate 135 in FIG. 10, this is in contrast to the operation above, where the spikes are shown being placed and driven into the middle spike passageway 72, 72 formed in plate 71 in FIG. 7A.

Figure 10:
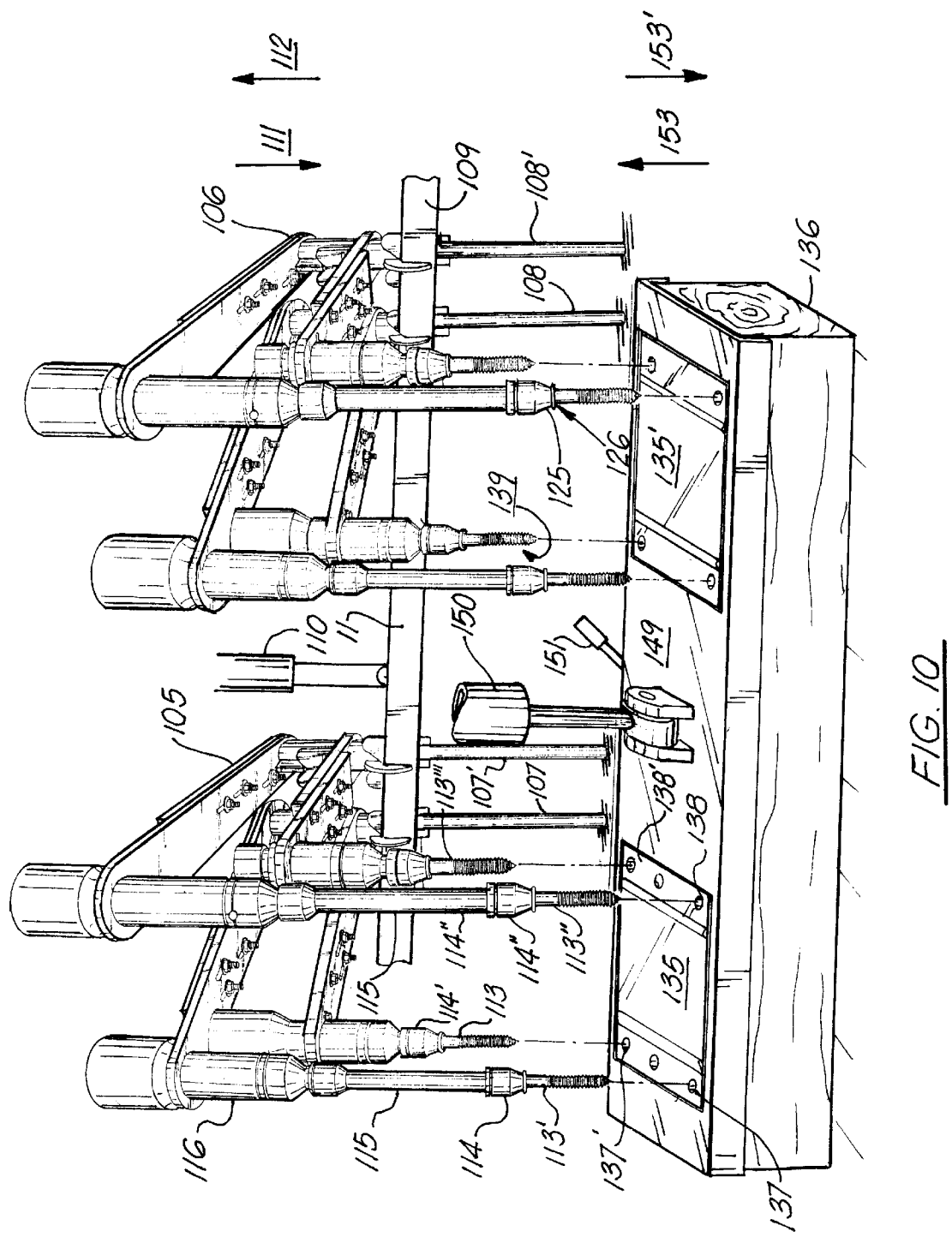
FIG. 10 is an isometric view of station three, that is, first and second arrays of pneumatic rachets with lag screw holders configured to vertically position held lag screws above the retainer holes in the plates, and, while racheting, lower the held screws through said retainer holes and into pre-driven pilot holes in stage one, threading said screws into same.
Figure 12:
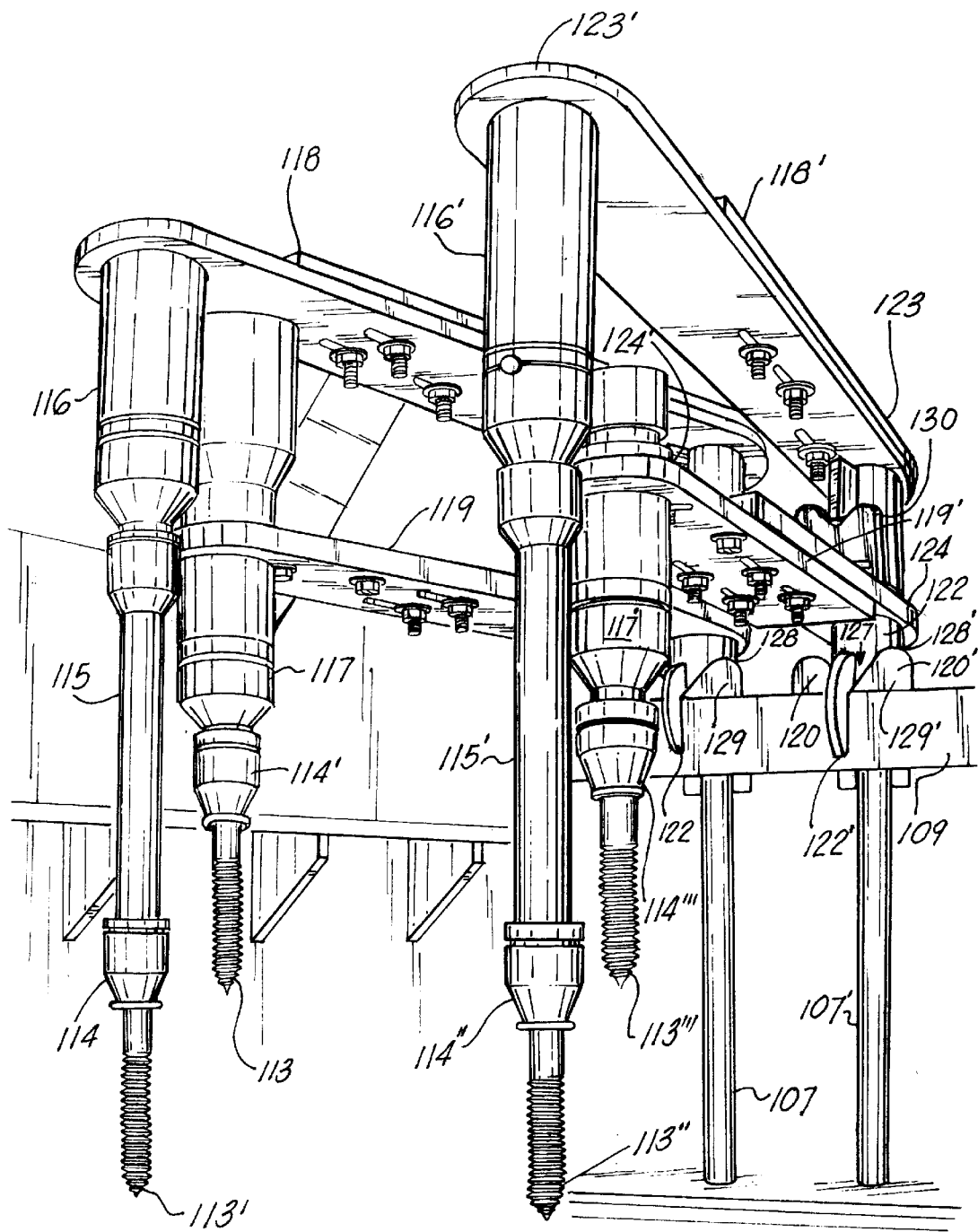
FIG. 12 is an isometric view of the first array of station three of FIG. 10.

Continuing with FIGS. 10 and 12, once the tie has passed through station two, it is then ready, where the user desires to have lag screws therein for fixing plates to the tie, for station three. As shown, the third, screw driving station includes first 105 and second 106 screw driving arrays slidingly engaged to vertical support members 107, 107' and 108, 108', which screw driving arrays 105, 106 are lifted 112 and lowered 111 vertically via reciprocating piston 110 driven horizontal support bar 109.

As shown, each screw driving arrays 105, 106 includes two front and two rear, motorized screw holding and driving mechanisms, comprising eight screw driving/holding mechanism total, spaced to drive two spaced sets of four screws each, in order to drive each set of fours screws in precise manner through screw passages formed in a single plate. Thus, the screw driving arrays 105, 106 in the present system facilitate the insertion of four screws each through two plates spaced on a single tie, as shown in FIG. 10. Operations below describe in detail the elements referenced in the first 105 screw driving array, but it is noted that both first 105 and second 106 screw drive arrays operate in identical fashion, having the same components, so descriptions of the operation of the first 105 drive array should be considered as occurring with regard to the second 106 drive array.

Continuing with FIGS. 10 and 12, each screw driving system comprises a screw holder 114, 114', 114", 114''', which in the preferred embodiment of the present invention is configured each to have a magnet 125 embedded therein to magnetically engage and support the head of a lag screw 113, 113', 113", 113''', respectively, which lag screws are loaded in the present embodiment to their respective screw holders manually. The front screw holders 114, 114" are supported by an extension 115, 115' configured to engage motors 116, 116', which are situated in spaced, forward relationship above rear motors 117, 117' of the rear screw driving mechanisms, which motors rear motors 117, 117' may be attached directly to screw holders 114', 114'" without an extension.

As shown on FIGS. 10, 11, 12 and 13, the front motors 116, 116' are supported by upper, independent horizontal support members 118, 118' having rear 123, respectively, while the rear motors 117, 117' are supported by lower horizontal support members 119, 119', respectively, which in turn slidingly engage vertical support members 107, 107', respectively.

The upper 118, 118' and lower 119, 119' support members each have first 123, 123, and second 123', 124' ends, respectively, the front ends engaging the motors, the rear ends of lower support 119, 119' engaging (FIG. 12), via fixed connection to sliding engagement tubes 128, 128', which are configured to slidindly engage vertical support members 107 and 107', respectively, as earlier indicated.

As shown, sliding engagement tubes 128, 128' each include a hook member 122, 122', each configured to interface with separate a centering member 129, 129' mounted to the horizontal support bar 109, each centering member further including first 120 and second 120' upwardly directed centering pieces forming a downwardly directed, generally medially situated, centering indentation 127 configured to support centering members 122, 122' and urge same into an aligned position.

Figure 13:
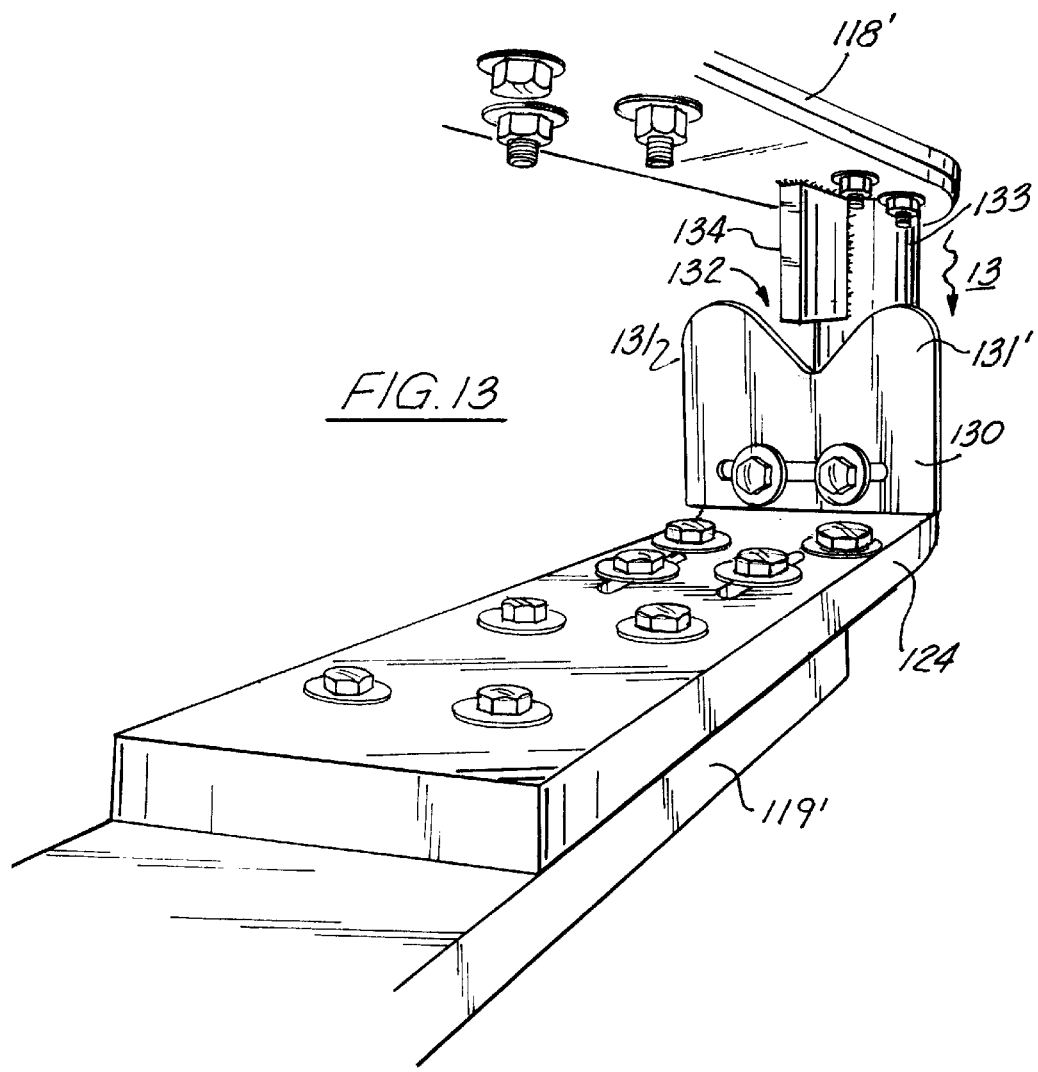
FIG. 13 is a close-up view of one of two centering/vertical guides for the first or second arrays of pneumatic rachets of FIG. 10.

Continuing with FIGS. 12 and 13, each lower horizontal support 119' further includes, at its second end 124, emanating in upward fashion a centering member 130 likewise including first 131, and second 131' upwardly directed centering pieces forming a downwardly directed, medially situated centering indentation 132 configured engage and support the upper horizontal support 118 via centering bar 134 configured to engage centering indentation 132, which centering bar is affixed to sliding engagement tube 133, which in turn is slidingly engaged to vertical support member 107.

Continuing with FIGS. 10, 10A, 10B, 11, and 14, the plates 135, 135' may be loaded and partially fastened via spikes 141, 141' driven through middle spike passages 142, at the second station, or the plates may be dispensed upon plate trays 144, 144' by utilizing a separate plate conveyor/dispenser 143 system like the one disclosed infra in the discussion of station two.

Like the previous two stations, the present screw driving station utilizes a template 149 to position and isolate the tie 136 to be processed, the template including a vertical manipulation piston 150 for lifting 153 or lowering 153' the template, a lateral positioning piston 151 for lateral 154 positioning via shaft 151', the template further having first 152 and second 152', downwardly directed lips emanating from opposing side edges of the template to communicate with the sides of the tie, for lateral manipulation of same. Lastly, the template has formed therein, as earlier discussed, first and second plate trays 144, 144' to engage plates situated therein.

In operation, the operator would allow the pre-bored tie 136 (pilot boring accomplished at the first, drilling station) under the raised template 149, which is then lowered and laterally positioned 154. After positioning, if the plates were not earlier dispensed in station two, the plates are dispensed via plate conveyors optionally provided at this station. Care must be taken to align the tie such that the pilot bores 14, 146', 155, 155' earlier formed therein conform to the location of the passages formed in the plates 137, 137', 138, 138' for the passage of the lag screws therethrough.

Figure 11:
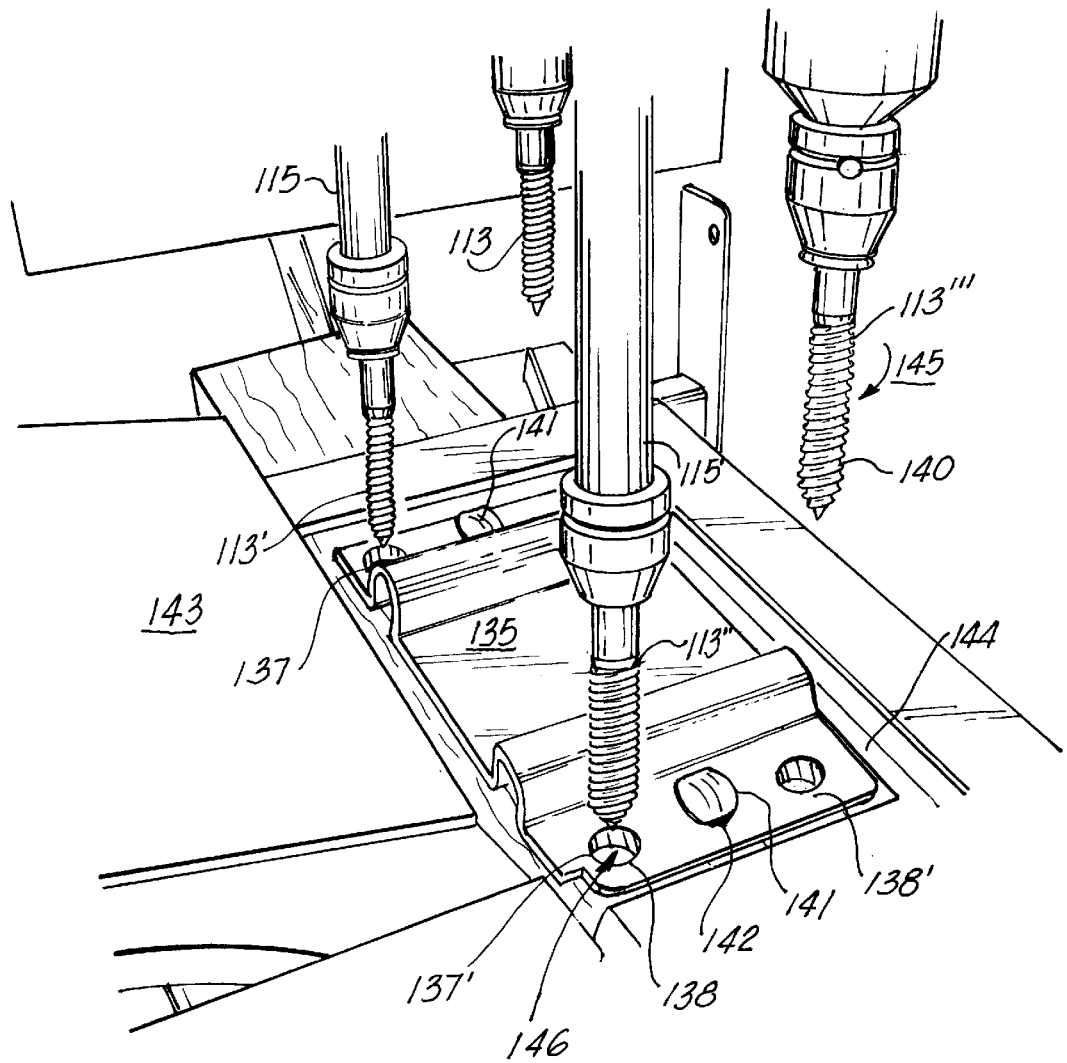
FIG. 11 is a close-up view of the first array of pneumatic rachets of FIG. 10, illustrating the front rachets holding lag screws in a position above the retaining holes of the preplate, prior to screwed insertion into pre-formed pilot holes formed in the cross-tie.
Figure 14:
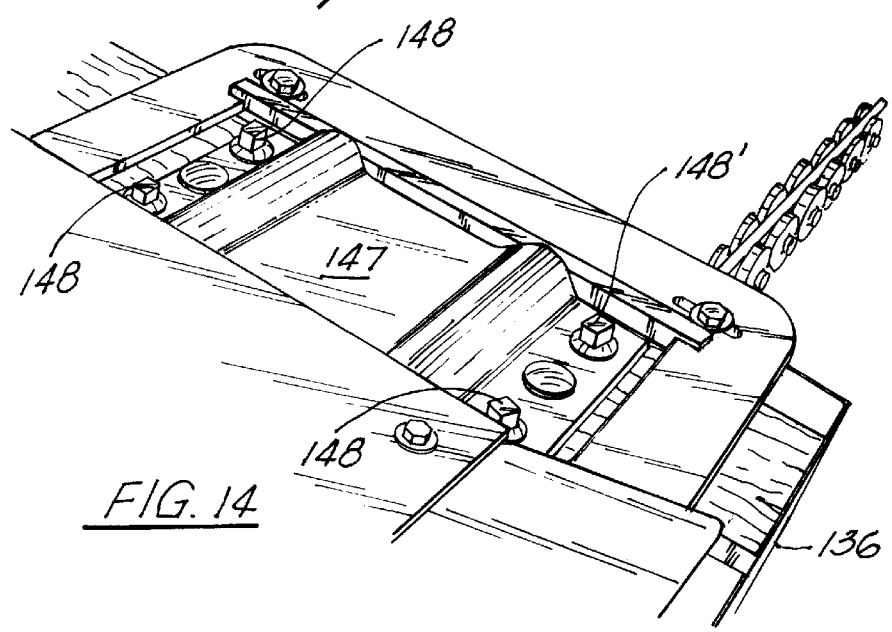
FIG. 14 is an isometric view of a plate having been secured to a tie via lag screws utilizing the rachets of rachet arrays of FIG. 10.

The operator then, by hand loads the lag screws 113, 113', 113", 113'", to the screw holders, and then may apply grease to the threads of same to facilitate easier insertion, and then initiates motors 116, 116', 117, 117', then lowering rotating 139 screws via piston 110 communicating with horizontal support bar 109. As shown in FIGS. 10 and 11, the front screws 113', 113" engage the front 137, 137' screw passages formed in tie 135 first, passing through said passages and into pilot bores 146 pre-formed thereunder, with the rear screws 113, 113'" thereafter lowering and boring 145 into their respective screw passages 138, 138' and pre-formed pilot bores thereunder, until the lag screw heads engage the tops of the plates, providing screwed lag screws 148, 148' on a fastened plate 147 to tie 136, as shown in FIG. 14. The screw driving apparatus is then lifted 153 via piston 110, as shown in FIG. 10, completing screwed fastening of the plate to the tie.

Figure 15C:
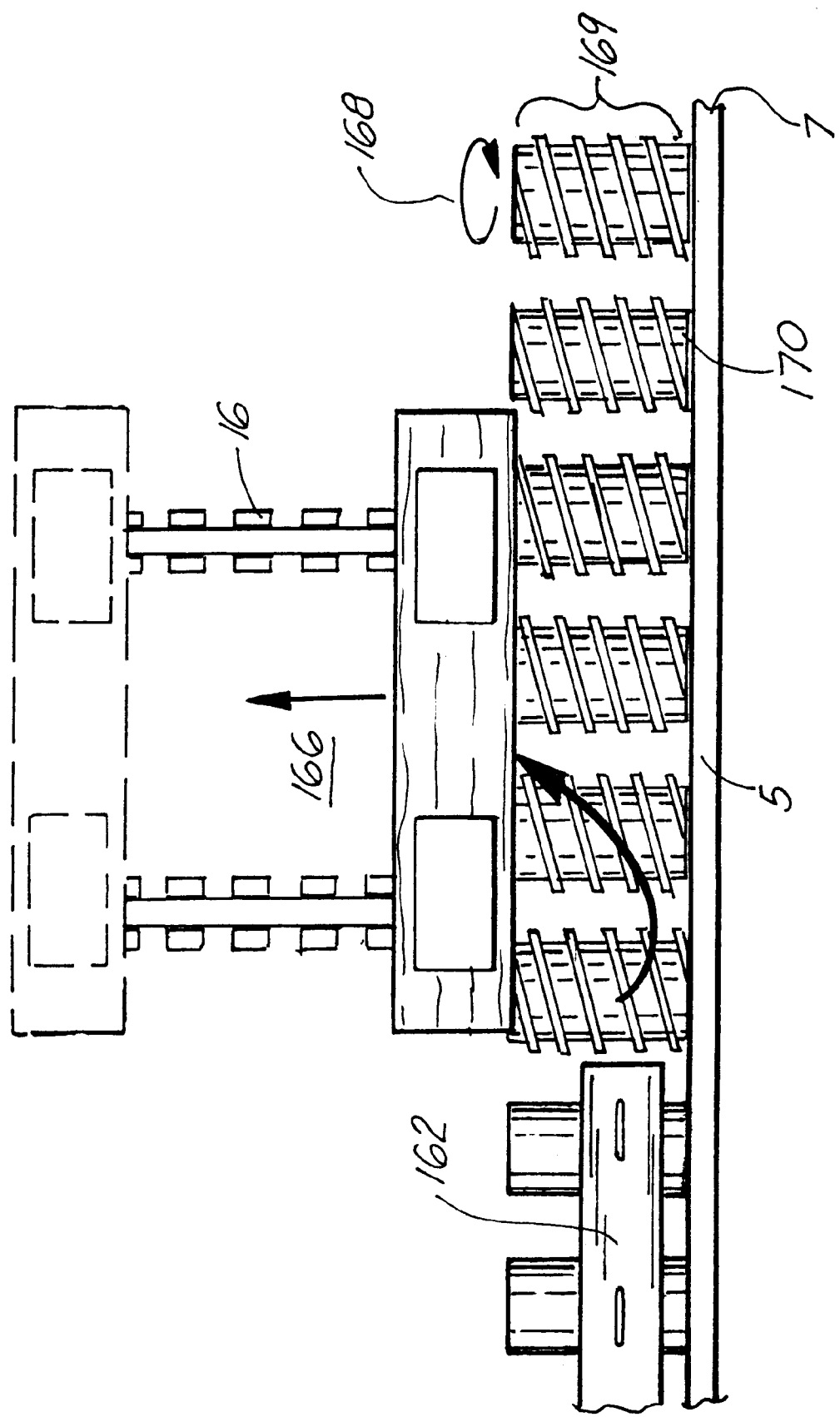
FIG. 15C is a top view of the invention of FIG. 15B, illustrating the conveyor reversing direction, with threads upon the conveyor cylinders directing the conveyor upon the unloading ramp for unloading.

Continuing with FIGS. 15A–15C, the second end 7 of the horizontal conveyor 5 includes a plurality of rollers 170 having formed about their exterior diameter a worm gear-configured thread 161, 169, the rotation of which in a clockwise direction 167 urges the tie 160 up 164 and through 163 backstop 162 toward the second end 7 of conveyor. Upon passing though backstop 165, to discharge the plated tie 160, the operator reverses the rollers to rotate in a counterclockwise 168 direction, reversing the tie and causing same to strike 165 backstop. With the rollers still rotating in a counterclockwise direction, the cross-tie us urged off 166 of the conveyor by the worm gear-configured threads upon the rollers, and on to the unloading ramp 16.

Exemplary Specifications

First Station

Drill motors: Manufacturer: Char-Lynn, Model 101, Power Torque: 250 Lb/In), RPM: 850 (variable);
Drill Bits—First Station: Size: ½–¾+(varies); Configured Depth of Bore: 8" or less (varies);

Second Station

Hydraulic Pistons for driving conventional spikes: Manufacturer:Bailey Mfg. Model: Custom Made. Stroke: 16", Tons/force:50
Hydraulic pistons for spike holders: Manufacturer:Custom made. Stroke: 16", Tons/force: 0.25.

Third Station

Screw Driver Motors: Manufacturer:White Mfg, Model: RE Series, Power:291/451 torque per 100 psi in inch pounds; RPM50/33 for small displacement motors and large displacement motors, respectively;
Screw type: Lag Screw, diameter: varies, Length:varies.

Conveyor

Horizontal conveyor Length: 30'; Width: 12"

Power Pack

Hydraulic Power: Manufacturer:Dennison & Rexroth, Model: T6C+A10V,
Power:Drills: 40 HP; Capacity: 34 gpm@1200 psi
Power: Press: 60 HP; Capacity: 60 gpm@1500 psi; 22 gpm@3500 psi
Power: Screw: 40 HP Capacity: 33 gpm@1500 psi The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A railroad cross-tie pre-plating system for fastening a rail plate to a cross-tie, comprising:
   a generally horizontal conveyor having first and second ends, and a medial area generally therebetween:
   a pre-plating apparatus situated adjacent to said horizontal conveyor, said pre-plating apparatus further comprising:
      cross-tie manipulation means for appropriate positioning of said cross-tie in the vicinity of said pre-plating apparatus,
      a plate conveyor having first and second ends, respectively, said first end of said plate conveyor terminating near said pre-plating apparatus;
      plate dispensing means for dispensing an individual plate from said plate conveyor, for placement upon a cross-tie situated in said pre-plating area;
      a spike manipulation arm for individually positioning a spike above a spike aperture formed in said dispensed plate;
      spike driving means for driving said positioned spike through said spike aperture formed in said dispensed plate into a cross-tie, fastening said plate to the tie.

2. The railroad cross-tie pre-plating system of claim 1, wherein there is further provided:
   cross-tie boring means for boring a series of spaced pilot bores formed in said cross-tie, such that said series of spaced bored bores formed in said cross-tie are situated directly below spike apertures formed in said dispensed plate, when said dispensed plates are placed thereupon.

3. The railroad cross-tie pre-plating system of claim 2, wherein said cross-tie boring means further comprises a first and second drill arrays supported by a template, said template configured to engage a cross-tie situated upon said horizontal conveyor, said first and second drill arrays having motorized drill bits configured to drill through an open space formed in said template, into the cross-tie.

4. The railroad cross-tie pre-plating system of claim 3, wherein there is further provided:
   screw driving means for driving a screw into said pilot pores formed in said cross-tie, in such a manner as to affix said dispensed plate to the cross-tie.

5. The railroad cross-tie pre-plating system of claim 4, wherein said screw driving means further comprises first and second screw driving apparatus, each comprising a motorized shaft having a screw holder affixed thereto for releasably securing a screw head; and vertical manipulation means for lifting or lowering said screw driving apparatus, said vertical manipulation means configured to vertically manipulate a screw held by said screw head through a spike aperture formed in said plate, and into a bore formed by said cross-tie boring means.

6. The railroad cross-tie pre-plating system of claim 5, wherein said vertical manipulation means further comprises a generally vertically situated reciprocating piston, and wherein there is further provided lateral manipulation means for laterally manipulating a cross tie in the vicinity of said screw driving means, said lateral manipulation means further comprising a template having a lateral positioning reciprocating piston.

7. The railroad cross-tie pre-plating system of claim 1, wherein said horizontal conveyor is situated upon a mobile base.

8. The railroad cross-tie pre-plating system of claim 7, wherein said mobile base comprises a railroad flat car.

9. The railroad cross-tie pre-plating system of claim 7, wherein said mobile base comprises a flat bed trailer.

10. A railroad cross-tie pre-plating apparatus for fastening first and second plates having first and second spike apertures to a cross-tie, comprising:
    a central, horizontal conveyor having first and second ends, and a medial area generally therebetween;
    a cross-tie loader situated in contact with said first end of said central conveyor, said loader configured to selectively dispense a single cross-tie onto said central conveyor upon demand;
    a pre-plating apparatus situated adjacent to said central conveyor, comprising an template, said template having first and second side edges, and first and second ends, said template having disposed thereon vertical manipulation means for lifting or lowering said template on demand, said template further having formed therein first and second plate cut-outs, said first and second cut-outs arranged to provide the appropriate area for placement of first and second plates, respectively, to a single tie under said template, said pre-plating apparatus further comprising:
    lateral manipulation means for laterally positioning a tie under said template;
    first and second plate conveyors having first and second ends, respectively, said first end of said first plate conveyor near the first plate cut-out of said template, said first end of said second plate conveyor situated near said second plate cut-out of said template, said plate conveyors configured such that a plate dispensed from said first end of first or second conveyor would land within the first or second plate cut-out formed in said template, respectively;
    spike driving means for driving said spikes through the dispensed plates and into the dispensed tie;
    first and second pairs of spike holders for individually holding and positioning a spike above a respective spike aperture formed in one of said first or second dispensed plates, so that said spike may be driven into the dispensed tie, by said spike driving means, in such a manner as to fasten said plate to the tie.

11. The railroad cross-tie pre-plating apparatus of claim 10, wherein there is further provided:
    plate dispensing means for dispensing individual plates from said first and second plate conveyors automatically, said plate dispensing means comprising first and second pivotal loading members fitted to said first and second plate conveyors, said pivotal loading members having a front blocking member configured to interface with a first plate, selectively preventing the movement of or dispensing said first plate, said pivotal loading members having a rear blocking member configured to interface with a second plate when said first plate has been dispensed.

12. The railroad cross-tie pre-plating apparatus of claim 11, wherein said spike holders further comprising at least one sensor for engaging said spike holders to move from under said spike driving means, once said spikes have begun being driven into said dispensed tie by said spike driving means.

13. The cross-tie pre-plating apparatus of claim 10, wherein said lateral manipulation means further comprises a reciprocating piston communicating with said template.

14. The cross-tie pre-plating apparatus of claim 10, wherein there is further included horizontal manipulation means for horizontally manipulating the dispensed tie, positioning said tie under said upper template in the general horizontal position for dispensing the spikes and plates.

15. The railroad cross-tie pre-plating system of claim 10, wherein there is further provided:

cross-tie boring means for boring a series of spaced pilot bores formed in said cross-tie, such that said series of spaced bored bores formed in said cross-tie are situated directly below spike apertures formed in said dispensed plate, when said dispensed plates are placed thereupon.

16. The railroad cross-tie pre-plating system of claim 15, wherein said cross-tie boring means further comprises a first and second drill arrays supported by a template, said template configured to engage a cross-tie situated upon said horizontal conveyor, said first and second drill arrays having motorized drill bits configured to drill through an open space formed in said template, into the cross-tie.

17. The railroad cross-tie pre-plating system of claim 16, wherein there is further provided:

screw driving means for driving a screw into said pilot pores formed in said cross-tie, in such a manner as to affix said dispensed plate to the cross-tie.

18. The railroad cross-tie pre-plating system of claim 17, wherein said screw driving means further comprises first and second screw driving apparatus, each comprising a motorized shaft having a screw holder affixed thereto for releasably securing a screw head; and vertical manipulation means for lifting or lowering said screw driving apparatus, said vertical manipulation means configured to vertically manipulate a screw held by said screw head through a spike aperture formed in said plate, and into a bore formed by said cross-tie boring means.

19. The railroad cross-tie pre-plating system of claim 18, wherein said vertical manipulation means further comprises a generally vertically situated reciprocating piston, and wherein there is further provided lateral manipulation means for laterally manipulating a cross tie in the vicinity of said screw driving means, said lateral manipulation means further comprising a template having a lateral positioning reciprocating piston.

20. The railroad cross-tie pre-plating system of claim 10, wherein said horizontal conveyor is situated upon a mobile base.

21. The railroad cross-tie pre-plating system of claim 20, wherien said mobile base comprises a railroad flat car.

22. The railroad cross-tie pre-plating system of claim 21, wherein said mobile base comprises a flat bed trailer.

23. A railroad cross-tie pre-plating apparatus for fastening a plate having a spike aperture to a cross-tie, comprising:

a horizontal conveyor having first and second ends;

a pre-plating apparatus situated adjacent to said horizontal conveyor, comprising an template having a first and second side edges, and first and second ends, said template having disposed thereon manipulation means for positioning said template above said horizontal conveyor, said template further having formed therein a plate cut-out situated to provide the appropriate area for placement of a plate to a cross-tie under said upper template, said pre-plating apparatus further comprising:

plate dispensing means for dispensing a plate, spike driving means for driving said dispensed spike through the dispensed plate and into the dispensed tie, a spike manipulation arm for individually positioning a spike above a spike aperture formed in said dispensed plate, so that said spike may be driven into the dispensed tie, in such a manner as to fasten said plate to the tie.

24. A railroad cross-tie pre-plating apparatus for fastening a plate having a spike aperture to a cross-tie, comprising:

a horizontal conveyor having first and second ends, and a medial area generally therebetween;

a pre-plating apparatus juxtaposed said horizontal conveyor, comprising a template, said template having a first and second side edges, and first and second ends, said template having disposed thereon vertical manipulation means for lifting or lowering said template on demand, said template further having formed therein a plate cut-out situated to provide the appropriate area for placement of a plate to a cross-tie under said upper template, said pre-plating apparatus further comprising:

lateral manipulation means for laterally situating a cross-tie on said horizontal conveyor, a plate conveyor having first and second ends, respectively, said first end of said plate conveyor near said plate cut-out of said upper template, said plate conveyor configured such that a dispensed plate would land on or near said plate cut-out of said template;

plate dispensing means for dispensing an individual plate from said plate conveyor, said plate dispensing means comprising a pivotal loading member fitted to said plate conveyor, said pivotal loading member having a front blocking member configured to interface with a first plate, selectively preventing the movement of or dispensing said first plate, said pivotal loading member having a rear blocking member configured to interface with a second plate when said first plate has been dispensed;

a spike manipulation arm for individually positioning each dispensed spike above a spike aperture formed in said dispensed plate, so that said spike may be driven through the spike aperture formed in said dispensed plate and into the dispensed tie, so as to fasten said plate to the tie.

25. The cross-tie pre-plating apparatus of claim 24, wherein there is further included cross-tie unloading means, comprising worm geared rollers at generally the second end of said horizontal conveyor.

ELEMENTS of the Invention
Date: Monday, March 15, 1999 12:03 pm
Client: Coastal Timbers
Title: Cross Tie Preplating System IV

| Element | Description |
| --- | --- |
| I | Invention |
| B | Base (flatbed trailer or railcar) |
| C | cross-tie |
| 1 | first end |
| 2 | second end |
| 3 | top surface |
| 4 | longitudinal axis |
| 5 | horizontal conveyor |
| 6 | first end |
| 6' | space between rollers on conveyor |
| 7 | second end |
| 8 | motorized rollers |
| 9 | first station - drilling |
| 10 | plating/spike driving |
| 11 | screw driving |
| 12 | medial area of conveyor |
| 13 | loading ramp/conveyor |
| 13',13" | loading ramp first/second ends |
| 14 | plurality of unplated ties |

-continued

ELEMENTS of the Invention
Date: Monday, March 15, 1999 12:03 pm
Client: Coastal Timbers
Title: Cross Tie Preplating System IV

| Element | Description |
|---|---|
| 15 | load individually upon horizontal conveyor |
| 16 | unloading ramp |
| 16' | distal end |
| 17 | plurality of plated ties |
| 18 | unloaded from horizontal conveyor |
| 19 | main operating station |
| 20 | operator |
| 21 | plate conveyor |
| 22 | plates |
| 23 | secondary operating station |
| 24 | plates |
| 25 | optional, secondary plate conveyor |
| 26 | passageway for chippings sawdust debris, etc. |
| 27 | auger |
| 27' | collection area (FIG. 2A) |
| 28 | tube |
| 29 | bin |
| 30 | debris |
| 31 | directed into |
| 32 | motor |
| 33 | rollers |
| 34 | next tie to be dispensed |
| 35 | tie being dispensed |
| 35' | tie being drilled |
| 36 | kicker |
| 37 | first end of lift |
| 37' | pivots |
| 38 | second end of lift |
| 39 | lifted |
| 40 | via piston |
| 40' | blocking member |
| 41 | blocking next tie to be dispensed |
| 42 | dispensing tie over stop 35 onto conveyor 5 |
| 43 | piston retracts |
| 44 | allowing next tie 34 |
| 45 | loading position |
| 46 | bumper aligns tie 35 |
| 47 | roller |
| 48,' | pivotal support arms |
| 49 | vertical movement |
| T | template |
| 50, | first, second drilling array |
| 51,' | pilot bores in tie |
| 52,52' | drilling platforms |
| 53,53' | tubes for sliding engagement |
| 54,54' | vertical support members |
| 55,55' | vertical movement |
| 56,56' | pistons |
| 57,57' | hoses |
| 58,58' | motors |
| 59,59' | drill bits |
| 60 | template piston |
| 61,61' | drilling space for passage of bits through template at appropriate spacing for later plate |
| 62 | tie |
| 62' | lateral adjustment piston |
| 63 | lateral adjustment |
| 63','' | template downwardly directed lip to longitudinaly envelop tie |
| 64,64' | first and second piston driving areas |
| 65,' | first and second ends |
| 66 | template |
| 67,67' | lateral adjustment lip |
| 68 | lateral adjustment piston |
| 68' | lateral adjustment |
| 69 | vertical adjustment piston |
| 69' | vertical adjustment |
| 70,' | plate tray |
| 71 | plate |
| 72,' | spike passage |
| 73,73' | plate conveyors |
| 74 | plate dispenser mechanism |
| 75 | base |

-continued

ELEMENTS of the Invention
Date: Monday, March 15, 1999 12:03 pm
Client: Coastal Timbers
Title: Cross Tie Preplating System IV

| Element | Description |
|---|---|
| 76 | front lip |
| 77 | rear lip |
| 77' | dispenser member |
| 78 | medial support |
| 79 | pivots |
| 80 | control rod |
| 81 | adjustable rod |
| 82 | pull |
| 83 | pivot front lip down |
| 84 | releasing plate down conveyor into plate passage 70' |
| 85 | pivots rear lip up |
| 86 | frictionally communicating with underside, preventing movement |
| 87 | next plate to be dispensed |
| 88 | lower rear lip |
| 89,' | spike holder mechanism |
| 90 | raise front lip, preventing further progression of next plate to be dispensed |
| 91' | horizontally situated |
| 92 | retract |
| 93 | extend |
| 94,' | first magnetic spike holders |
| 95,' | second magnetic spike holders |
| 96,' | spikes |
| 97,' | placing spikes above plate, spike passages 72,' respectively |
| 98,' | spike driving head |
| 99,' | pistons |
| 100,' | drive spike down, down |
| 101 | tie |
| 102 | spike |
| 103 | spike into tie |
| 104 | retract holder |
| 105 | first screw driving array |
| 106 | second screw driving array |
| 107,' | vertical support members |
| 108,' | vertical support members |
| 109 | horizontal support bar |
| 110 | piston |
| 111 | down |
| 112 | up |
| 113,','',''' | lag screws |
| 114,','',''' | screw holder |
| 115,' | extension |
| 116,' | motors (upper, front) |
| 117 | motors (lower, lower) |
| 118,' | upper horizontal support (front) |
| 119,' | lower horizontal support (lower) |
| 120,' | wings |
| 121 |  |
| 122 | centering member |
| 123,' | first end |
| 124,' | second end |
| 125 | magnet in screw holder |
| 126 | head |
| 127 | centering indentation |
| 128 | tubular support member/sliding engagement |
| 129,' |  |
| 130 | centering means |
| 131,' | first and second centering wings |
| 132 | forming centering indentation |
| 133 | slding engagement tube |
| 134 | centering member |
| 135,' | plates |
| 136 | tie |
| 137,' | spike holes |
| 138,' | spike holes |
| 139 | rotate |
| 140 | grease |
| 141,' | spikes |
| 142 | spike hole (center) |
| 143 | plate conveyor |

-continued

ELEMENTS of the Invention
Date: Monday, March 15, 1999 12:03 pm
Client: Coastal Timbers
Title: Cross Tie Preplating System IV

| Element | Description |
|---|---|
| 144 | plate tray |
| 145 | rotate drill to screw |
| 146 | pilot bore |
| 147 | fastened plate |
| 148 | screwed lag screws into tie |
| 149 | template |
| 150 | vertical manipulation piston for lifting, lowering |
| 151 | piston |
| 151' | shaft |
| 152,' | lip |
| 153,' | lifting, lowering |
| 154 | lateral adjustment |
| 155,' | pilot holes |
| 156 | |
| 157 | |
| 158 | |

-continued

ELEMENTS of the Invention
Date: Monday, March 15, 1999 12:03 pm
Client: Coastal Timbers
Title: Cross Tie Preplating System IV

| Element | Description |
|---|---|
| 159 | |
| 160 | crosstie |
| 161 | threaded |
| 162 | backstop |
| 163 | through |
| 164 | up |
| 165 | strikes |
| 166 | off to unloading ramp |
| 167 | clockwise - forward |
| 168 | counterclockwise, reverse and off via threads |
| 169 | worm gear-configured threads |
| 170 | rollers |

\* \* \* \* \*